United States Patent
Halper et al.

(10) Patent No.: US 10,405,064 B2
(45) Date of Patent: Sep. 3, 2019

(54) SYSTEMS AND METHODS FOR PROMPTING AND INCORPORATING UNSCRIPTED USER CONTENT INTO LIVE BROADCAST PROGRAMMING

(71) Applicant: Kuma LLC, New York, NY (US)

(72) Inventors: Keith Halper, Summit, NJ (US); Richard Palacio, Portland, OR (US)

(73) Assignee: Kuma LLC, New York, NY (US)

( * ) Notice: Subject to any disclaimer, the term of this patent is extended or adjusted under 35 U.S.C. 154(b) by 0 days.

(21) Appl. No.: 16/162,888

(22) Filed: Oct. 17, 2018

(65) Prior Publication Data
US 2019/0058928 A1    Feb. 21, 2019

Related U.S. Application Data

(60) Provisional application No. 62/573,415, filed on Oct. 17, 2017.

(51) Int. Cl.
*H04N 21/262*    (2011.01)
*H04N 21/475*    (2011.01)
(Continued)

(52) U.S. Cl.
CPC ..... *H04N 21/8545* (2013.01); *H04N 21/2187* (2013.01); *H04N 21/234309* (2013.01); *H04N 21/26258* (2013.01); *H04N 21/2743* (2013.01); *H04N 21/4758* (2013.01); *H04N 21/8456* (2013.01)

(58) Field of Classification Search
CPC ....... H04N 21/8545; H04N 21/234309; H04N 21/26258; H04N 21/4758; H04N 21/2187; H04N 21/2743; H04N 21/8456
See application file for complete search history.

(56) References Cited

U.S. PATENT DOCUMENTS 8,413,206 B1 *  4/2013  Wyatt ............... H04N 21/25866
                                                    725/136
9,264,159 B2 *  2/2016  Moskowitz ............ H04H 60/33
(Continued)

OTHER PUBLICATIONS

"Wikipedia HQ Trivia," 2017, https://en.wikipedia.org/wiki/HQ_Trivia.
(Continued)

*Primary Examiner* — Sumaiya A Chowdhury
(74) *Attorney, Agent, or Firm* — DLA Piper LLP (US)

(57) ABSTRACT

Systems and methods for providing interactive live broadcast programming. A system includes an ingest server, a show creation server, and a streaming server. The ingest server is configured to receive, from at least one client device, one or more user generated responses to interaction prompts associated with a live broadcast program and process the received one or more responses for content and/or compatibility with the live broadcast program and store the processed response in a database. The show creation server is configured to generate a segment to be added to an interactive live program by generating a playlist. The streaming server is configured to transcode the interactive live program with the segment into at least one format suitable for display on the display associated with the client device, and transmit the transcoded interactive live program to the respective client device for display.

30 Claims, 42 Drawing Sheets

(51) Int. Cl.
    *H04N 21/845*     (2011.01)
    *H04N 21/2187*    (2011.01)
    *H04N 21/2343*    (2011.01)
    *H04N 21/2743*    (2011.01)
    *H04N 21/8545*    (2011.01)

(56) References Cited

U.S. PATENT DOCUMENTS

| | | | |
|---|---|---|---|
| 10,104,355 B1* | 10/2018 | Clark | G11B 27/105 |
| 2010/0005501 A1* | 1/2010 | Stokking | G10H 1/365 |
| | | | 725/115 |
| 2018/0189030 A1* | 7/2018 | Thaker | G06F 7/36 |
| 2018/0341877 A1* | 11/2018 | Panattoni | G06Q 50/01 |

OTHER PUBLICATIONS

"Choose-Your-Own-Adventures Just Landed on Netflix. Yes, Netflix." https://www.bloomberg.com/news/articles/2018-10-01/netflix-is-said-to-plan-choose-your-own-adventure-black-mirror.
Shaw, Lucas, "Netflix Is Planning A Choose-Your-Own-Adventure 'Black Mirror'," Oct. 1, 2018, https://www.wired.com/story/netflix-branching-narratives/.

\* cited by examiner

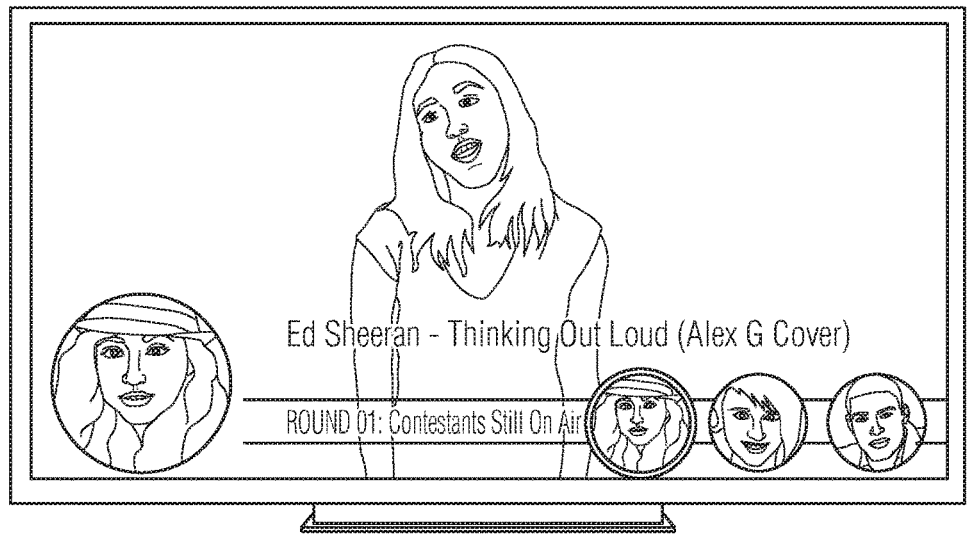
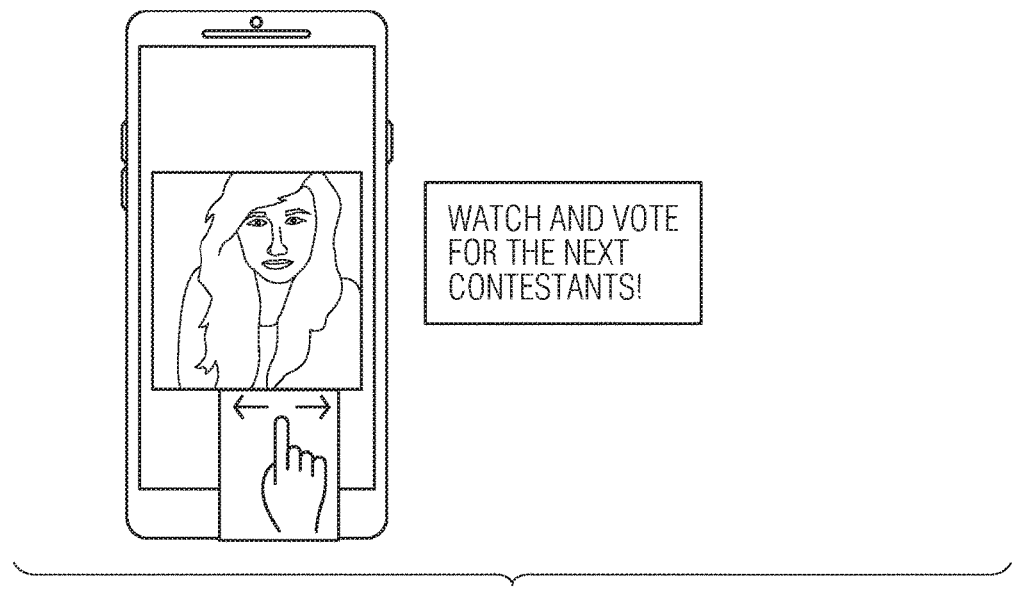
FIG. 9A

FIG. 9B

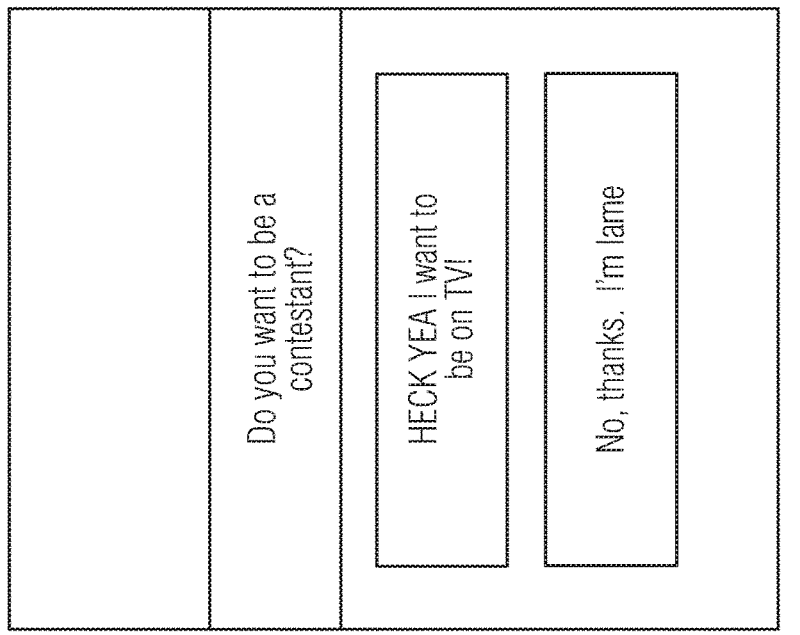
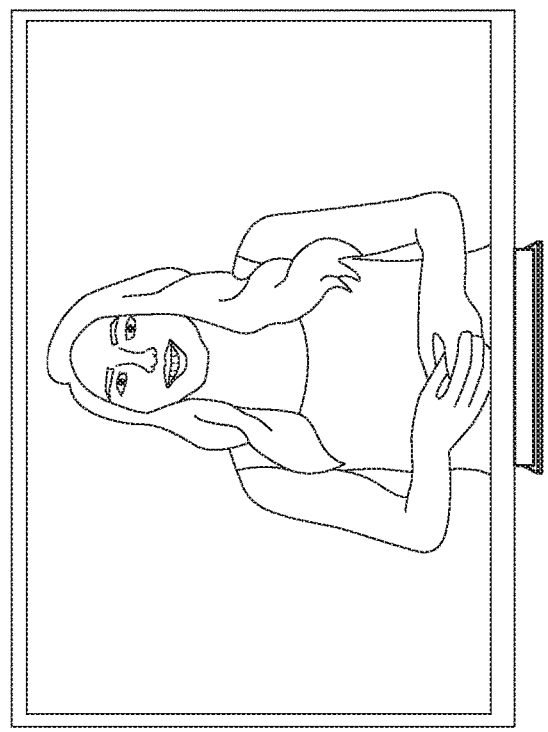
FIG. 9D

FIG. 12K

SYSTEMS AND METHODS FOR PROMPTING AND INCORPORATING UNSCRIPTED USER CONTENT INTO LIVE BROADCAST PROGRAMMING

TECHNICAL FIELD

The present disclosure is directed towards systems and methods for providing interactive live broadcast programming that incorporates unscripted user content into live broadcast programming.

BACKGROUND

Electronic games or video games are interactive experiences for players but are often unsocial, as the players are immersed in an imagined world without regard to the people or objects that surround them in the real world. For this reason, electronic games often provide a solitary experience. By contrast, conventional television is known to be both a social and non-interactive experience. For example, television is social in that viewers often view television as a group, and discuss the content of what they view in various forums ranging from online discussion boards to cafeterias. At the same time television is non-interactive, in that viewers are unable to interact with the content that they are viewing.

Accordingly, there is a need for technologies that integrate the social aspects of television with the interactivity of video games.

SUMMARY

In some embodiments, systems and methods to provide interactive live broadcast programming are discussed. For example user recordings responsive to a live broadcast may be integrated with live broadcast programming.

In some embodiments, a system for providing interactive live broadcast programming is described herein. The system includes at least one client device, at least one display device, an ingest server, a show creation server, and a streaming server. The at least one display device is associated with the at least one client device. The ingest server is configured to receive, from the at least one client device, one or more user generated responses to interaction prompts associated with a live broadcast program. The interaction prompts are displayed on the at least one display device associated with the at least one client device. The ingest server is configured to process the received one or more responses for content and/or compatibility with the live broadcast program. The ingest server is configured to store the processed one or more responses in a database. The show creation server is configured to generate a segment to be added to an interactive live program by generating a playlist. The playlist includes at least one response among the stored one or more responses to form the segment and integrating the segment with the interactive live program. The streaming server is configured to transcode the interactive live program with the segment into at least one format suitable for display on the at least one display associated with the at least one client device. The streaming server is configured to transmit the transcoded interactive live program to the at least one client device for display.

In some embodiments, a method of facilitating a live broadcast program is disclosed herein. A computing system provides a live broadcast program to one or more client devices for display. The computing system comprises non-transitory memory storing computer readable instructions and a processor configured to execute the computer readable instructions. The live broadcast program includes one or more interaction prompts. The computing system receives, from at least one device among the one or more client devices, one or more user generated responses to an interaction prompt associated with live broadcast program. The computing system processes the received one or more responses for content and/or compatibility with the live broadcast program. The computing system stores the one or more responses that are compatible with the live broadcast program in a database. The computing system generates a segment to be added to the live broadcast program by generating a playlist that includes at least one response among the stored one or more responses to form the segment. The computing system integrates the segment with the live broadcast program. The computing system transcodes the live broadcast program with the segment into at least one format suitable for display on a display associated with each of the one or more client devices. The computing system transmits the transcoded live broadcast program to the one or more client devices for display.

In some embodiments, a non-transitory computer readable medium is disclosed herein. The non-transitory computer readable medium includes computer readable instructions, which, when executed by one or more processors, cause the one or more processors to perform operations. The operations include providing a live broadcast program to one or more client devices for display. The live broadcast program includes one or more interaction prompts. The operations include receiving, from at least one device among the one or more client devices, one or more user generated responses to an interaction prompt associated with live broadcast program. The operations include processing the received one or more responses for content and/or compatibility with the live broadcast program. The operations include storing the one or more responses that are compatible with the live broadcast program in a database. The operations include generating a segment to be added to the live broadcast program by generating a playlist that includes at least one response among the stored one or more responses to form the segment. The operations include integrating the segment with the live broadcast program. The operations include transcoding the live broadcast program with the segment into at least one format suitable for display on a display associated with each of the one or more client devices. The operations include transmitting the transcoded live broadcast program to the one or more client devices for display.

In another embodiment, a system for providing interactive live broadcast programming is disclosed herein. The system includes an ingest server, a show creation server, and a streaming server. The ingest server is configured to receive, from at least one client device, one or more user generated responses to interaction prompts associated with a live broadcast program. The interaction prompts are displayed on at least one display device associated with the at least one client device. The ingest server is configured to process the received one or more responses for content and/or compatibility with the live broadcast program, and store the processed one or more responses in a database. The show creation server is configured to generate a segment to be added to an interactive live program by generating a playlist that includes at least one response among the stored one or more responses to form the segment and integrating the segment with the interactive live program. The streaming server is configured to transcode the interactive live program with the segment into at least one format suitable for display on the at least one display associated with the at least one client device. The streaming server is configured to transmit the transcoded interactive live program to the at least one client device for display.

BRIEF DESCRIPTION OF THE DRAWINGS

FIGS. 9A, 9B, 9C, 9D, 9E, 9F, 9G, and 9H illustrates one or more screenshots of an interactive live broadcast program, according to example embodiments.

FIGS. 12A, 12B, 12C, 12D, 12E, 12F, 12G, 12H, 12I, 12J, and 12K illustrate one or more screenshots of an interactive live broadcast program, according to example embodiments.

DETAILED DESCRIPTION

Figure 1:
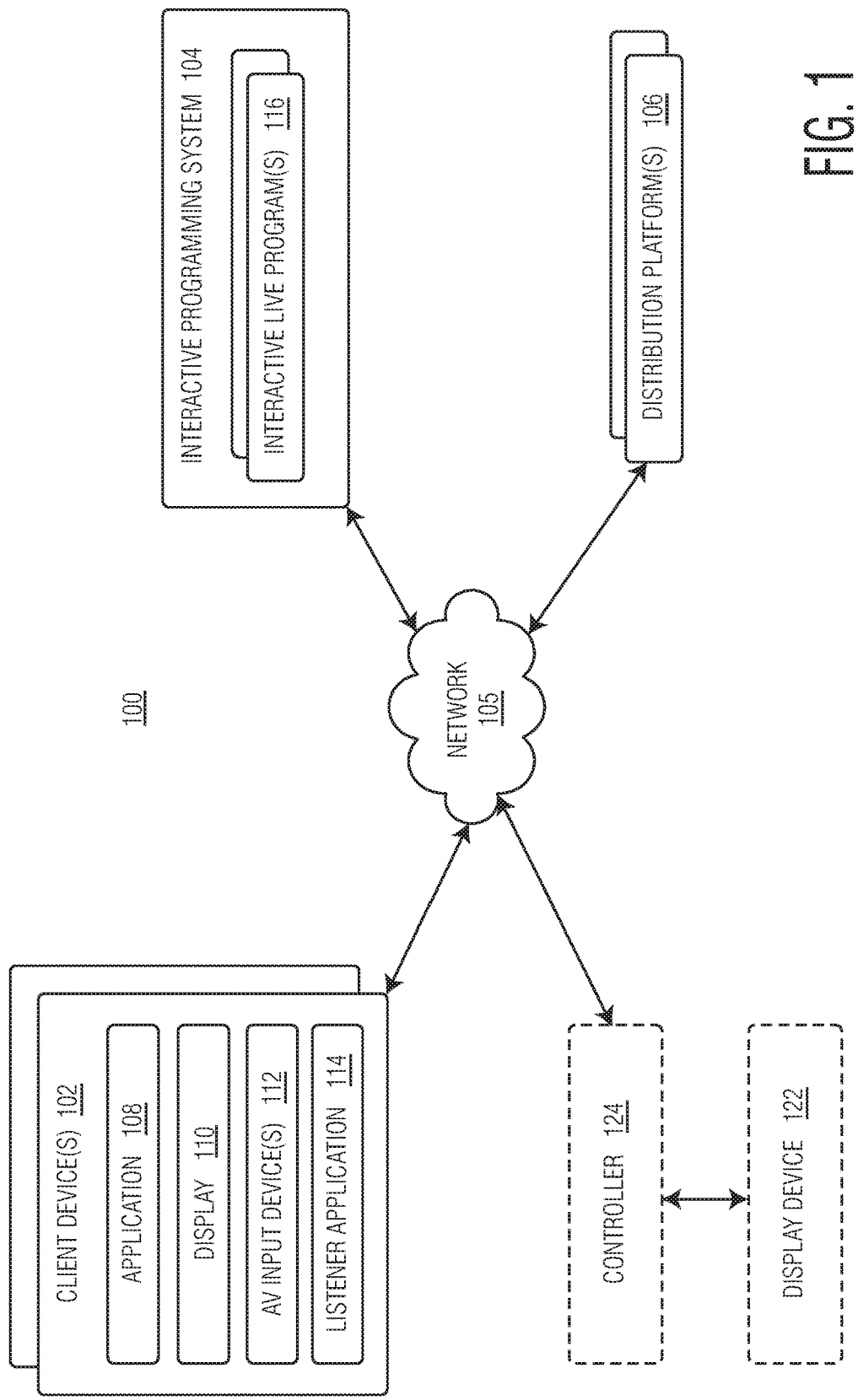
FIG. 1 is a functional block diagram illustrating an example computing environment, according to example embodiments.

Systems and methods for providing interactive live broadcast programming are described herein. Live broadcast programming may include, for example, television programming (broadcast television, cable television, satellite, etc.), internet streaming programming, etc. As will be discussed further, in interactive live broadcast programming, viewers may use a client device, such as a mobile phone and the like, to view live broadcast programming and also to participate in a live broadcast program, such as live television programming. In some embodiments, viewers may use a separate display device (e.g., monitor, television, etc.) to view live broadcast programming and a client device to participate in the live broadcast program.

Viewers may watch broadcast programming (i.e., television programming) or videos on any number of distribution platforms including broadcast television, YouTube, Facebook Video, ROKU®, Apple TV®, Xfinity®, and the like. Broadcast programming may include game shows, news, financial news shows, live reality shows, live completion shows, and opinion shows, and the like. In some embodiments, the broadcast programming may invite the viewer to interact with the programming by recording unscripted content such as a video corresponding to a reply, an answer, a vote, a song, etc. The medium by which the viewer replies to the invitation may vary according to the platform. For example, the viewer may reply to an invitation by clicking a screen button (e.g., on a Facebook or YouTube platform), clicking on their remote (e.g., on ROKU® or Xfinity® platform), clicking a link (e.g., YouTube on mobile web platform), initiating a phone call, making an Audio Intent (e.g., on Amazon Alexa, Siri®, or other voice platforms).

In some embodiments, upon responding to the invitation, the viewer may access an interactive programming system. In some embodiments, the interactive programming system may be an application on a device, a webpage, a phone-based system, a thin client developed for a particular TV microconsole (e.g., ROKU®, Xfinity®, Chromecast™), and the like. In some embodiments, the separate interactive programming system may allow a viewer to record voice, video, images, and/or other audio, provide an indication as to an intended use of the recording, and transfer the recording from the user device (the unscripted user content) to the interactive programming system. In some of the examples described herein, the live broadcast program is described as a television program. It is understood that this is an example embodiment, and that the live broadcast program may include any suitable live broadcast program, including, but not limited to a television program (e.g., broadcast television, cable television, streaming television, satellite, etc.), as discussed herein.

The interactive programming system may be communicatively coupled with the distribution platform such that the (unscripted content) recording may be integrated into the live programming after the recording is moderated by one or more algorithms and/or administrators. Moderating the recording may include transcribing the audio portion and/or evaluating video portions of a recording and/or assigning ratings to users (e.g., based on prior comments, past popularity, user trust factors, and the like). The interactive programming system may evaluate the audio portions and/or video portions of the recording for moderation and subsequent use in a live broadcast program. Evaluation may be based, for example, on one or more user trust factors. User trust factors may include factors such as a longevity of the user's account, whether the user uses a real name, whether the user uses a real picture, if the user is logged in, if the user's account is coupled to a social media account, the age of the user's account, past user posts, if the user has been flagged positively or negatively by a moderator and/or the audience in the past, and the like. The content may be ranked or ordered by these ratings such that a moderator is able to integrate the top-ranked recordings into the live programming faster. The recording may also be processed for audio quality, video quality and/or to add recorder information such as a name or picture. After undergoing moderating and processing, the recording may be stored in a database. The interactive programming system may also include one or more algorithms that are capable of retrieving recordings stored in the database based on the specific shows and topics. As such, the interactive programming system may be configured to have low-risk content from trusted users go immediately to broadcast, to create a fluid show experience (whether it is a conversation or a game show, it may be desirable to provide a rapid turnaround.) Indeed, it may be appreciated that, without evaluation for appropriateness and content on an automated or semi-automated basis, there can be no interactive live TV.

In some embodiments, the interactive programming system may also include a listener application that may render a selected recording (from the database) in the appropriate video stream for the distribution platform a viewer is using. For example, YouTube streaming may be different than Roku streaming format in terms of file formats, size ratios, overlay graphics, and the like.

In some embodiments, the interactive programming system may provide a structured show design and media analysis processes to intelligently assemble crowd-sourced media into broadcast programming so as to provide interactive live broadcast programming.

FIG. 1 is a functional block diagram illustrating computing environment 100, according to example embodiments. Computing environment 100 may be configured to provide interactive live broadcast programming. As illustrated, computing environment 100 may include one or more client devices 102, interactive programming system 104, and one or more distribution platforms 106 communication over network 105.

Network 105 may be of any suitable type, including individual connections via the Internet, such as cellular or Wi-Fi™ networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, universal serial bus (USB), wide area network (WAN), or local area network (LAN). Because the information transmitted may be personal or confidential, security concerns may dictate that one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, a virtual private network using a public network and/or other suitable connection(s) that enables components in computing environment 100 to send and receiving information between the components of computing environment 100.

Client device 102 may be operated by a user. Client device 102 may be a mobile device, a tablet, a desktop computer, or any computing system having the capabilities described herein. For example, client device 102 may be any suitable device including, for example, mobile devices such as tablet computers (e.g., Apple iPad, Samsung Galaxy Tab, etc.), smart phones (e.g., Apple iPhone, Blackberry Phone, Android Phone, etc.), gaming devices (e.g., PlayStation, Xbox), smart watches (e.g., Apple Watch, etc.), Smart Assistants (Alexa, Google Home, Siri), Television Remotes, Personal Digital Assistants (PDAs), Personal Computer devices (PCs; through web browser and installable software) and other similar devices.

Each client device 102 may include at least application 108 and listener application 114. Listener application 114 is described further below. Application 108 may be representative of a web browser that allows access to a website or stand-alone application. Client device 102 may access application 108 to access one or more functionalities of interactive programming system 104. Client device 102 may communicate over network 105 to request, for example, one or more web pages (or more generally, content) from interactive programming system 104. The content that is displayed via client device 102 may be transmitted from interactive programing system 104 to client device 102, and may subsequently be processed by application 108 for display.

In some embodiments, client device 102 may be associated with one or more audio/visual input/out devices. For example, client device 102 may be associated with display 110 and AV input devices 112. Display 110 may be any suitable display, such as, but not limited to, a touchscreen of a personal computing device, a monitor associated with a computing device, a television, and the like. Display 110 may be configured, for example, to display one or more graphical user interface (GUIs) transmitted to client device 102 from interactive programming system 104. AV input devices 112 may include one or more of a microphone and a camera. Generally, AV input devices 112 may be configured to capture one or more streams of audio and/or visual information to be transmitted to interactive programming system 104 for processing. In some examples, client device 102 may also include an audio signal output interface and/or device (such as a loudspeaker) for output of audio.

In some embodiments, computing environment 100 may further include separate display device 122. In some examples, display device 122 may be referred to as a shared screen. Display device 122 may be associated with controller 124. In some embodiments, controller 124 may be integrated with display device 122 (e.g., a smart TV). In some embodiments, controller 124 may be associated with display device 122. For example, controller 124 may be representative of a digital media device coupled with display device 122 either wirelessly or wired. Exemplary digital media devices may include, but are not limited to, Apple TV®, FireTV, Android TV, Google Chromecast™, ROKU®, and the like. Generally, controller 124 may be configured to obtain one or more interactive live programs 116 from interactive programming system 104 for rendering and display.

Interactive programming system 104 may be configured to generate and mange an interactive and social viewing experience for end users. Interactive programming system 104 may be representative of one or more computing devices. For example, interactive programming system 104 may be representative of a distributed computing system, wherein each device of the distributed computing system may act as a host for one or more virtualization elements (e.g., operating system (OS)-level virtualization elements, hardware-level virtualization elements) that include one or more modules or engines for facilitating and managing the interactive programming experience for end users.

Interactive programming system 104 may be configured to generate and/or provide one or more interactive live broadcast programs 116 (also referred to herein as interactive live program(s) 116). For example, interactive programming system 104 may create interactive live broadcast program 116, which may include one or more prompts or invitations to encourage users to participate in the broadcast program. Accordingly, a user may respond to the prompts/invitations by submitting, via client device 102, audio and/or or visual data to be included in interactive live broadcast program 116. Accordingly, interactive programming system 104 may be configured to inject the received audio and/or visual data into a particular interactive live broadcast program 116, thereby facilitating interaction between client device(s) 102 and interactive programming system 104.

Interactive programming system 104 may be in communication with distribution platform 106. For example, interactive programming system 104 may transmit interactive live program 116 to distribution platform 106, such that distribution platform 106 may transmit interactive live program 116 to client device(s) 102 and/or controller 124. Distribution platform 106 may be representative of one or more computing systems associated with a media provider (e.g., YouTube, Comcast, Facebook, etc.). In operation, interactive programming system 104 may provide distribution platform(s) 106 with updated interactive live broadcast program(s) 116, as interactive programming system 104 receives one or more responses to the one or more prompts or invitations. Accordingly, distribution platform 106 may be configured to broadcast the live programming stream containing the inserted segment (based on the user recording).

Referring back to client device 102, listener application 114 may be configured to execute alongside the broadcast of interactive live program(s) 116. Although shown as a component of client device 102, listener application 114 may be a component of interactive programming system 104. In some embodiments, listener application 114 may be a component of controller 124 in addition to, or in lieu of, client device 102. Generally, each distinct listener application 114 may be designed to improve (e.g., optimize) playback and interaction on a variety of devices and combinations of client devices 102 and/or display device 122 in use by a particular user on a particular show design. The flexibility of interactive programming system 104 may provide convenience to users by enabling use of interactive programming system 104 with whatever combination of devices end users may have, while keeping the show design independent of consumer device choices for maximum distribution and creativity in show design for interactive producers. As stated above, interactive live program 116 may include one or more prompts or invitations that encourage users to participate in live interactive program 116. Listener application 114 may analyze interactive live program 116 to identify when the prompt(s)/invitation(s) appear on display 110. For example, if the user is watching a news broadcast that includes prompt(s)/invitations(s) (e.g., via display 110 or display device 122), listener application 114 may be configured to generate an actionable graphical element that recites "record and submit." User selection of the graphical element may launch a recording portal in application 108 that may allow the user to record and/or upload a recording.

In another example, if a user is watching interactive live program 116 on display device 122, listener application 114 on client device 102 or controller 124 may track interactive live program 116 on display device 122, and generate a graphical element on display device 122. In another example, if the user is listening to interactive live program 116 on an audio-only device, listener application 114 on the audio-only device may initiate an audio "call to action" so the user can choose to record their voice.

Invitations can have different actions for different users; for instance metadata might instruct listener application 114 to poll interactive programming system 104 to instruct distribution platform 106 to broadcast a recording to a specific user. Accordingly, the inclusion of such metadata in interactive live program 116 enables interactive programming system 104 to transmit programming to a specific user.

In a broadcast environment, for example, listener application 114 may reside remotely, and may render a video stream that may be experienced by multiple users simultaneously. In some examples, the video stream may be viewed on non-interactive devices, while continuing to support an interactive show. Users may participate in the interactive show while watching the video stream by utilizing one of a variety of companion devices, each device leveraging a version of listener application 114 to generate one or more actionable elements (e.g., buttons on a phone screen, voice prompts on an Amazon Echo, contextual buttons on a ROKU® remote, etc.) that may be used to initiate recording or other responses sequenced to the live play back of the video feed.

Figure 2:
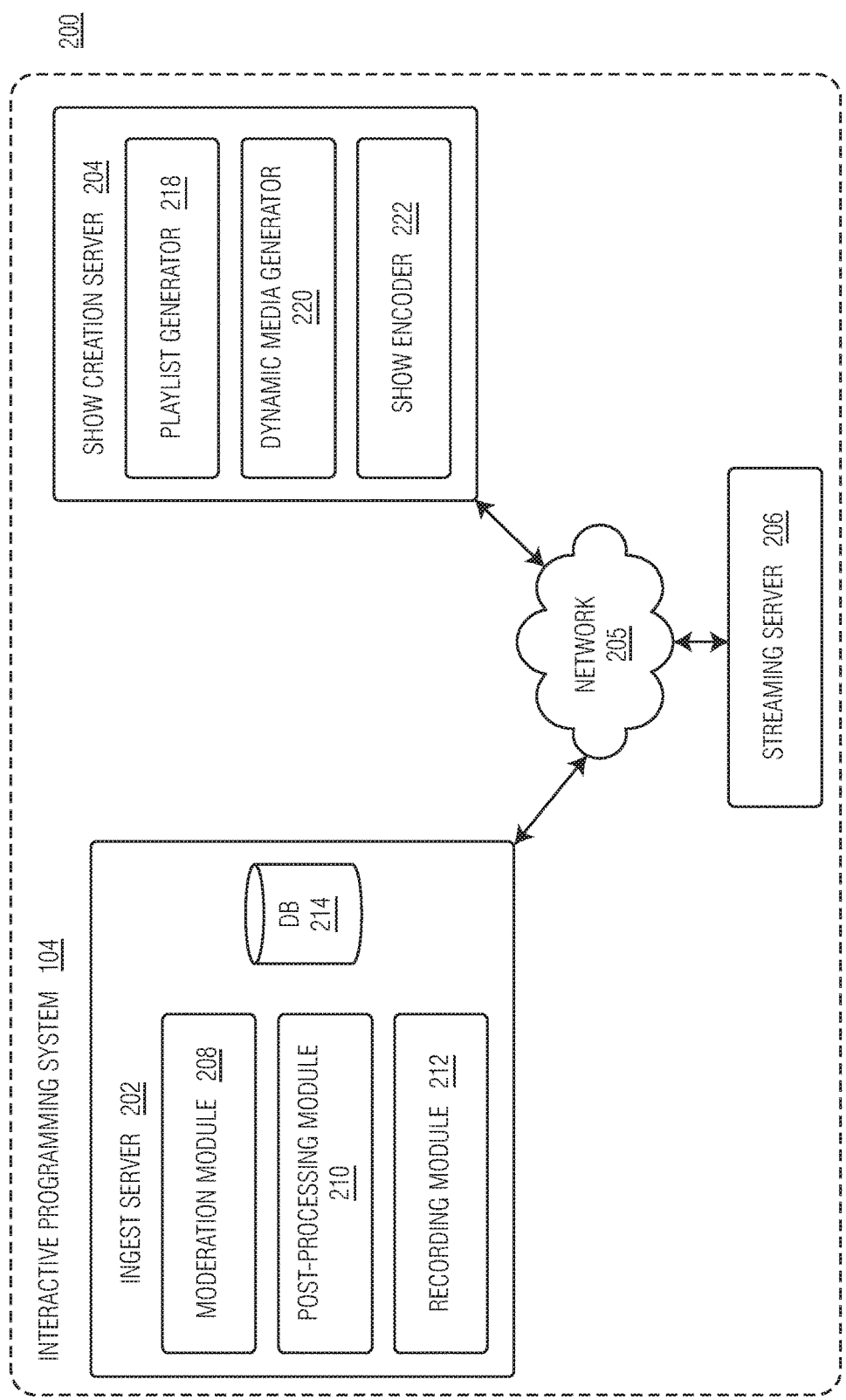
FIG. 2 is a functional block diagram illustrating an interactive programming system that may be used in the computing environment shown in FIG. 1, according to example embodiments.

FIG. 2 is a functional block diagram 200 illustrating one or more components of interactive programming system 104 in more detail, according to example embodiments. Interactive programming system 104 may include ingest server 202, show creation server 204, and streaming server 206 communicating via network 205. Network 205 may be configured similarly to network 105.

In some embodiments, one or more of ingest server 202, show creation server 204 and streaming server 206 may be representative of one or more physical computing devices. In some embodiments, one or more of ingest server 202, show creation server 204, and streaming server 206 may be virtual servers embodied across one or more virtualization elements executing on one or more physical, host computing systems.

Ingest server 202 may be configured to analyze, normalize, and store user responses (i.e., user recordings) to interactive live broadcast program(s) 116. Ingest server 202 may include moderation module 208, post-processing module 210, recording module 212, and database 214.

Recording module 212 may be configured to work in conjunction with client device 102 to generate a user recording. For example, interactive live broadcast program 116 may be provided to end user(s) via client device 102 and/or display device 111. Interactive live broadcast program 116 may include one or more invitations or prompts that encourage users to interact with the program. The prompt(s)/invitations(s) may be, for example, actionable hyperlinks, selectable by the user, wherein selection of the prompt(s)/invitations(s) may indicate a user's intent to "reply" to the invitation via client device 102. Client device 102 may then engage with ingest server 202 via application 108 executing thereon. In some embodiments, the invitations may be one or more video segments in interactive live program 116. Generally, the prompt(s)/invitations(s) may include metadata associated therewith, such that listener application 114 can identify the prompt(s)/invitations(s) and generate one or more graphical elements corresponding to the prompt(s)/invitations(s).

Recording module 212 may provide a platform specific method of ingesting user provided recordings from a range of devices such as, without being limited to, Alexa, Android, iOS, Roku, Apple TV, Amazon TV, and the like. In some embodiments, the recording module 212 may interface with platform resources of client device 102, such as a camera application interface for iOS that may allow recording module 212 to access one or more AV input devices 112.

For example, if live programming is streamed on YouTube, the streamed programming may include one or more invitations for user participation. For example the video on YouTube may include an instruction on how to "reply and be on the air" and include one or more HTML links. Each hyperlink may include embedded information that may correspond to a particular show and context to which a user is responding. Once a user clicks on the HTML links, application 108 may direct a user to a web page, configured to allow a user to record a message from client device 102. The message may be transmitted to ingest server 202, which may cause recording module 212 to load a web page on client device 102. The web page may be specific to the particular live programming, topic, distribution platform, user device, and the like. Via the websites and/or applications provided by recording module 212, the user may record audio, text, and/or video responsive to the invitation. Via application 108, the user may be able to preview, edit, and then submit the recording. Once the recording is submitted, recording module 212 may transmit the video to post-processing module 210.

Post-processing module 210 may be configured to process a recording for quality control and/or transcription. For example, post-processing module 210 may normalize the recording, such that the volume, size, and resolution of audio, video and text recordings are consistent. Post-processing module 210 may include one or more algorithms to remove leading and tailing blank spaces, reduce background noise, adjust brightness, tonality, etc., submit the recording for transcription, seek keywords, and/or flag items in the transcription that may indicate the relevance or appropriateness of the recording. Post-processing module 210 may also be re-encoded to a desired file format. Post-processing module 210 may store relevant metadata in video storage database 214. Post-processing module 210 may also query and store user information. For example, user information may include a history of prior recordings, length of membership, and other criteria that allows for evaluation of the user's legitimacy. After processing, post-processing module 210 may transmit the recording to moderation module 208. In some embodiments, post-processing module 210 may transmit recordings to moderation module 208 along with queuing information.

Moderation module 208 may include one or more algorithms used for determining whether a recording should be added to video storage database 214 for display (e.g., client device 102 and/or on display device 111). In some embodiments, moderation module 208 may automatically evaluate the inbound video questionable content. For example, moderation module 208 may transcribe audio, evaluate still and video images, and the like. As such, moderation module 208 may allow interactive programming system 104 to confidently provide videos on air without a human review. In some embodiments, in addition to, or in lieu of, an automated review system, moderation module 208 may display on an administrator computing device (not shown) a queue of recorded videos ordered based on the quality and user information data determined by post-processing module 210. In some embodiments, the recorded videos may be displayed in a key-frame format, such that the administrator does not need to view the entire recording. In some embodiments, a recorded video may be displayed alongside the transcription from post-processing module 210, and/or user information. If the recording is flagged as having a higher risk level by post-processing module 210 or the one or more algorithms of moderation module 205, or if the contents of the video are unclear from the key-frames, the moderator may elect to review the entire recording. The moderator may then rate each user recording for relevance, maturity-level, quality and the like.

Moderation module 208 may then store the recording in video storage database 214. In some embodiments, before storage in video storage database 214, a recording may be stripped of metadata. In some examples, relevant user information, picture, and video information may be stored in video storage database 214 separately, but in a linked manner to the recording. As will be discussed further below, relevant metadata (e.g., a subset of the stored user information, a picture, and/or video information) may be added back to the recording at the time of playlist generation.

In some embodiments, the recordings stored in video storage database 214 may be organized according to channel (also referred to as a station). A channel may refer to a single streaming server stream. In other words, the recordings stored in video storage database 214 may be organized by the collection of videos most likely to be called by a single streaming server stream. For example, all topics and replies for a news and opinion live stream program may be stored together.

In some embodiments, the recording stored in video storage database 214 may be moved, or copied from a one channel to another. The recordings may be stored on a file system of streaming server 206 and/or distribution server 106.

In some embodiments, moderation module 208 may include software configured to detect whether the user provided recording contains objectionable content such as pornographic material, offensive remarks or behavior, and the like. Moderation module 208 may also include software configured to detect whether the user provided recording is responsive to the invitation for a user to interact with live interactive program 116.

Show creation server 204 may include playlist generator 218, dynamic media generator 220, and show encoder 222. Show creation server 204 may be configured to assemble user recordings into a new interactive—programming segment. For example, show creation server 204 may be configured to transform one or more segments of fragmented recordings into a coherent, intelligible stream. Show creation server 204 may receive recordings from the video storage database 214.

Playlist generator 218 may include show specific software that may intelligently select videos, images, and/or audio for inclusion in a show as a playlist. Playlist generator 218 may create a playlist for a specific show by querying video storage database 214. In some embodiments, each show or TV program may have its own playlist generator. Playlist generator 218 may request recordings that fit a particular set of criteria including video ratings, user information, relevance, and the like. In some embodiments, the resulting playlist may constitute a few minutes of recordings.

In some embodiments, playlist generator 218 may be configured to find the best media to insert into a particular live program design based on a variety of criteria specific to each show. The generated playlist may be an instruction set that lists the path or name of media elements (e.g., host topics, user replies, interstitials, sponsor videos, programmatic ad requests, metadata, graphical overlays, and interactive elements) to be used in the next segment of the live program. Playlist generator 218 may evaluate the videos, for example, to determine whether the submitter answered a question correctly, provided a relevant answer, was a higher quality video stream (i.e., did not yell or shout into the camera), and the like. In general, playlist generator 218 may be concerned with executing a particular show (live program) design. For example, playlist generator 218 may determine whether a next video is from a contestant, whether a response in a video is from the desired "side" of a conversation (e.g., for interest and diversity), is a response relevant to a do it yourself (DIY) question, etc.

Playlist generator 218 may be refreshed on a regular basis, so as to retrieve the most recently stored videos from database 214. This may allow, for example, a user to record an answer to a game show question and be on the air immediately. The playlist may also refer to user recordings, game scores, latest news, latest votes, latest ratings, and the like.

Playlist generator 218 may be specific to a particular program (show), program type and distribution platform. For example, a "Best Dog!" show may include playlist generator 218 that always contains the following segments: 1. Topic, 2. A Call to Action, 3. A Set of Recent Replies, 4. A Set of Highest Rated Replies, 5. A Set of Highest Rated User Replies, 6. A Set of Editor's Choice Replies, and 6. A Meta-Tag. The topic may include an invitation to a user/viewer to interact with the program. For example, the topic may include a video of a host saying "Post a picture of your dog doing a trick!" The Call to Action may include a generic voice-over and show-branded "Best Dog!" graphics that explain how to reply to the invitation using distribution platform (e.g., Facebook) interface elements. The Set of Recent Replies may include two replies from database 214 that may be chosen, for example, based on a recency of upload. A set of highest rated replies may include, for example, two replies from database 214 that are chosen based on which videos were rated highest by other users. In some embodiments, the video ratings may be done by a website communicatively coupled to database 214. The Set of Highest Rated User Replies may include one video chosen from database 214 based on an aggregate of frequency of a user's postings, the user's past post ratings, and the user's reputation score. The Set of Editor's Choice Replies may include one or more videos that are the moderator's choice. The Meta-Tag video may indicate that an advertisement be included.

Dynamic media generator 220 may be a show-specific process that is configured to pull video from database 214 according to the generated playlist, and format the videos for playback on a specific distribution platform. Dynamic media generator 220 may assemble video and text elements selected by the playlist into a single component or page and record it as a video signal. Dynamic media generator 220 may continuously read the playlist, load the media listed on the playlist, format the retrieved media by adding unique buttons, text overlay, video or audio interstitials, and play the media according to its animation scripts. The resulting output from dynamic media generator 220 may be called a screen. In some embodiments, the screens may be in HTML format.

Dynamic media generator 220 may also include advertisements for inclusion into the high quality video. The advertisements may be pulled from an advertisement server of the computing environment 100 (not shown) or from a third party advertisement system such as AdSense. The advertisements may be based on the requirements of the specific distribution platforms. In some embodiments, the advertisements may be pre-cached for easier streaming. Alternatively, dynamic media generator 220 may include a portion of blank space (e.g., 30 seconds of blank space) within the screens, such that a distribution platform may insert their own advertisements into the video. In some embodiments, dynamic media generator 220 may be based on a custom HTML-based application.

Dynamic media generator 220 may create a series of screens which may then be recorded as a video file (or audio file) by show encoder 222. Show encoder 222 may include distribution platform specific hardware and software systems for encoding the generated shows as high quality video and/or audio and push the generated high quality video to one or more streaming servers 206. Show encoder 222 may record the screens produced by the dynamic media generator 220 in a standard video file format. As will be discussed further below, the high quality video may be re-formatted at various resolutions and sizes (transcoded by distribution platform 106). In some embodiments, show encoder 222 may be based on an Open Broadcast Server (OBS). Dynamic media generator 220 may also be used to generate the invitations for user participation discussed above.

Streaming server 206 may be configured to prepare the new interactive programming segment for broadcast and may insert the prepared new interactive programming segment into a still-playing live programming stream (e.g., interactive live program 116). Streaming server 206 may be configured with hardware and software components that take the high quality video (produced by the dynamic media generator 220), encode the stream and transcode it for various distribution platforms 106. Distribution platforms 106 may include, without being limited to, YouTube, Xfinity, Web Stream, Radio or TV Broadcasting, Alexa, Facebook, and the like. Streaming server 206 may include a third party software such as Wowza. Streaming server 206 may transcode the high quality video into specified bitrates, dimensions, and/or formats.

Optionally, distribution platform(s) 106 may elect to archive or store a copy of the high quality video. Distribution platform(s) 106 may utilize content delivery networks such as Akamai, Alibaba, BitGravity, Facebook Live, YouTube, Limelight, MPEG-TS, RTMP, RTP, SHOUTcast, and the like.

Distribution platform(s) 106 may be configured to play a live video stream (e.g., HTTP live streaming, Adobe HDS, Microsoft Smooth Streaming, MPEG-DASH streaming, Adobe RTMP, RTSP/RTP) using QuickTime, VLC, 3rd Generation Partnership Project (3GPP) devices, set-top boxes and the like.

Distribution platform(s) 106 may also be configured to display the invitation(s)/prompt(s) to the user to interact with the live programming. For example, distribution platform(s) 106 may be configured to provide links to a HTML5 application, an HTML site, a phone-based voice response system (such as Alexa), an internal messaging system (Android), etc. Distribution platform(s) 106 may also provide a thin client application that may allow users to play and record videos (e.g., Roku).

In some embodiments, environment 100 described herein may provide interactive live programming that is responsive to user input (e.g., replies, votes, likes, etc.). The described computing environment 100 may include built-in lags between user recording and broadcast, and include automated systems for scanning user-generated content (i.e., post-processing and moderating). The combination of features may allow for display on distribution platform(s) 106 that require that user content be moderated before posting, while at the same time allowing for live (or near live) display of programming integrated with user generated content.

The combination of components in interactive programming system 104 may enable more efficient integration of user generated recordings into still-playing live programs.

Figure 3:
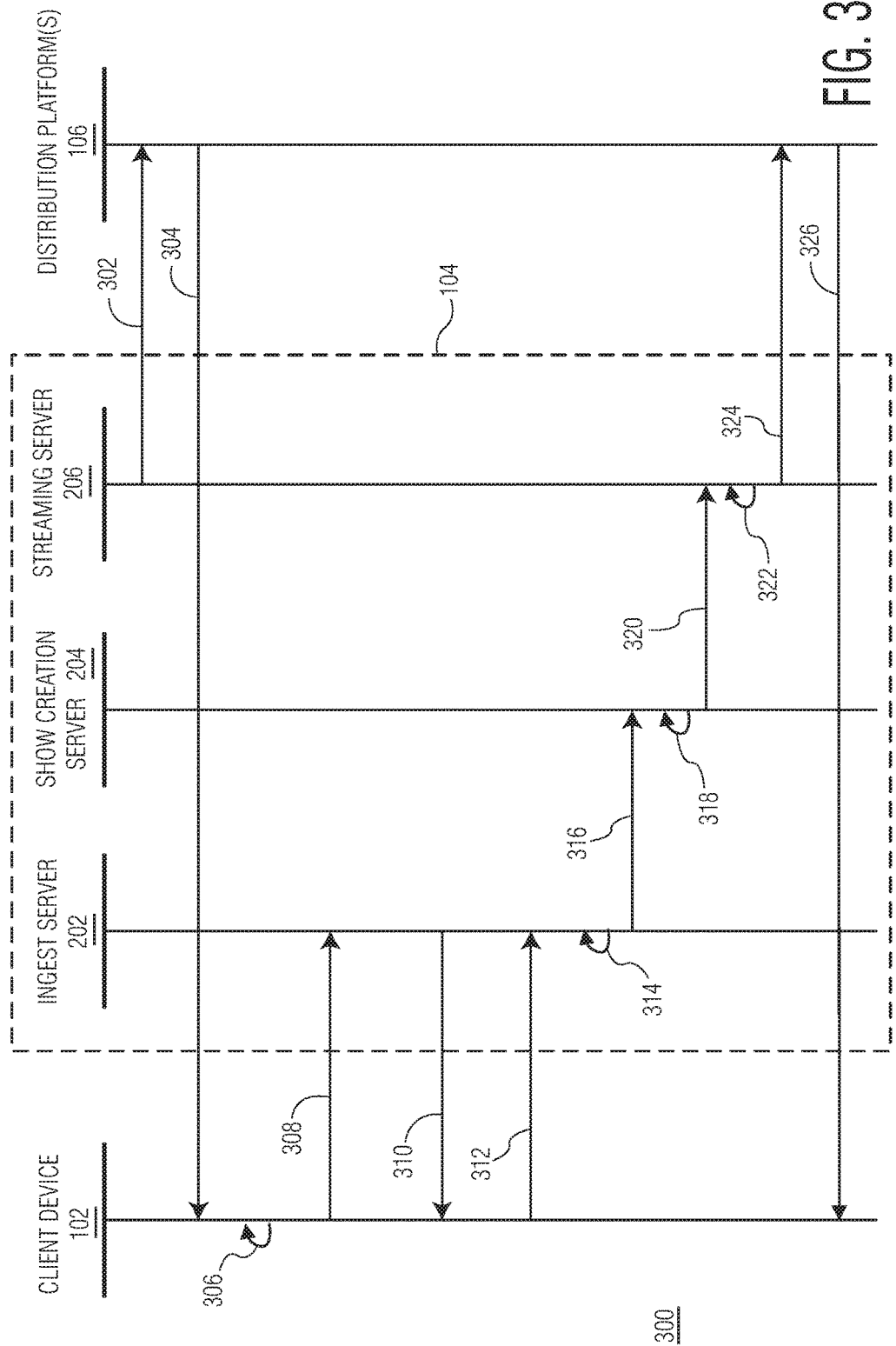
FIG. 3 is a signal flow diagram illustrating example communication among one or more components of the computing environment of FIG. 1, according to example embodiments.

FIG. 3 is a signal flow diagram 300 illustrating example communication among one or more components of the computing environment of FIG. 1, according to example embodiments. Signal flow diagram 300 may represent one or more operations that may be taken to broadcast an interactive live program to one or more client devices 102.

At operation 302, streaming server 208 may transmit live interactive program 116 to distribution platform 106 for broadcast. Live interactive program 116 may be include one or more prompts or invitations embedded therein. The prompt(s)/invitation(s) may be configured to invite or encourage end users to participate in live interactive program 116. In some embodiments, the prompt(s)/invitation(s)

may be one or more hyperlinks that overlay the program. Activation of the one or more hyperlinks may allow end users to upload a video to interactive programming system 104 for inclusion in live interactive program 116.

At operation 304, distribution platform 106 may receive interactive live program 116 from streaming server 106. Distribution platform 106 may, in turn, broadcast (or transmit) interactive live program 116 to client device(s) 102 and/or controller 115 for display. In some embodiments, distribution platform(s) 106 may transmit interactive live program 116 to application 108 executing on client device 102.

At operation 306, client device 102 may receive interactive live program 116 from distribution platform(s) 106. For example, in some embodiments, client device 102 may receive interactive live program 116 via application 108 executing thereon. During the broadcast of interactive live program 116, an end user of client device 102 may be prompted to participate in interactive live program 116. For example, during one or more moments or parts of interactive live program 116, an invitation or prompt may appear that invites or encourages users or viewers to participate in interactive live program 116.

At operation 308, client device 102 may submit a request to ingest server 202 to participate in interactive live program 116. For example, client device 102 may submit a request to access interactive programming system 104 via application 108.

At operation 310, ingest server 202 may receive the request from client device 102. In some embodiments, ingest server 202 may access one or more application programming interfaces (APIs) that provide client device 102 with access to interactive programming system 104. Ingest server 202 may notify client device 102 that one or more APIs are available for participation in interactive live program 116.

At operation 312, client device 102 may generate one or more recordings for inclusion in interactive live program 116. In some embodiments, client device 102 may capture one or more recordings via one or more AV input devices 112 associated with client device 102. For example, client device 102 may receive one or more streams of audio and/or visual data (i.e., a recording) to be uploaded to interactive programming system 104. Client device 102 may upload the recording to interactive programming system 104 via application 108.

At operation 314, ingest server 202 may receive the recording from client device 102. For example, the recording may be transferred to ingest server 202 via the one or more APIs. Ingest server 202 may analyze, normalize, and store the recording. Generally, ingest server 202 may process the recording for quality control and/or transcription. For example, ingest server 202 may normalize the recording, such that the volume, size, and resolution of the audio, video and text recordings are consistent, remove leading and tailing blank spaces, reduce background noise, adjust brightness, tonality, etc., submit the recording for transcription, seek keywords, and/or flag items in the transcription that indicate the relevance or appropriateness of the recording, re-encode the recording to a desired file format, and the like. Ingest server 202 may further determine whether a recording should be added to video storage database 214 for display on a display device (e.g., client device(s) 102 and/or display device 111).

At operation 316, ingest server 202 may notify show creation server 204 that recordings are available in database 214 for inclusion in interactive live program 116. For example, ingest server 202 may notify show creation server 204 that a new recording is available in database 214 for interactive live program 116.

At operation 318, show creation server 204 may process the received recording. Show creation server 204 may assemble user recordings into a new interactive programming segment. Show creation server 204 may receive recordings from video storage database 214 and create a playlist for a specific show by querying video storage database 214 for one or more recordings particular to interactive live program 116.

At operation 320, show creation server 204 may transmit the playlist to streaming server 206. For example, show creation server 204 may transmit the one or more recordings of the playlist to streaming server 206 for inclusion in interactive live program 116.

At operation 322, streaming server 206 may inject the one or more recordings in interactive live program 116. For example, streaming server 206 may prepare a new interactive programming segment and may insert the prepared new interactive programming segment into the still-playing live programming stream.

At operation 324, streaming server 206 may transmit the new interactive programming segment to distribution platform(s) 106. For example, streaming server 206 may instruct distribution platform(s) 106 to broadcast the new interactive programming segment to client device(s) 102 and/or controller 124.

At operation 326, distribution platform(s) 106 may receive the new interactive programming segment from streaming server 206. Distribution platform(s) 106 may transmit the new interactive programming segment to client device(s) 102 and/or controller 124.

Figure 4:
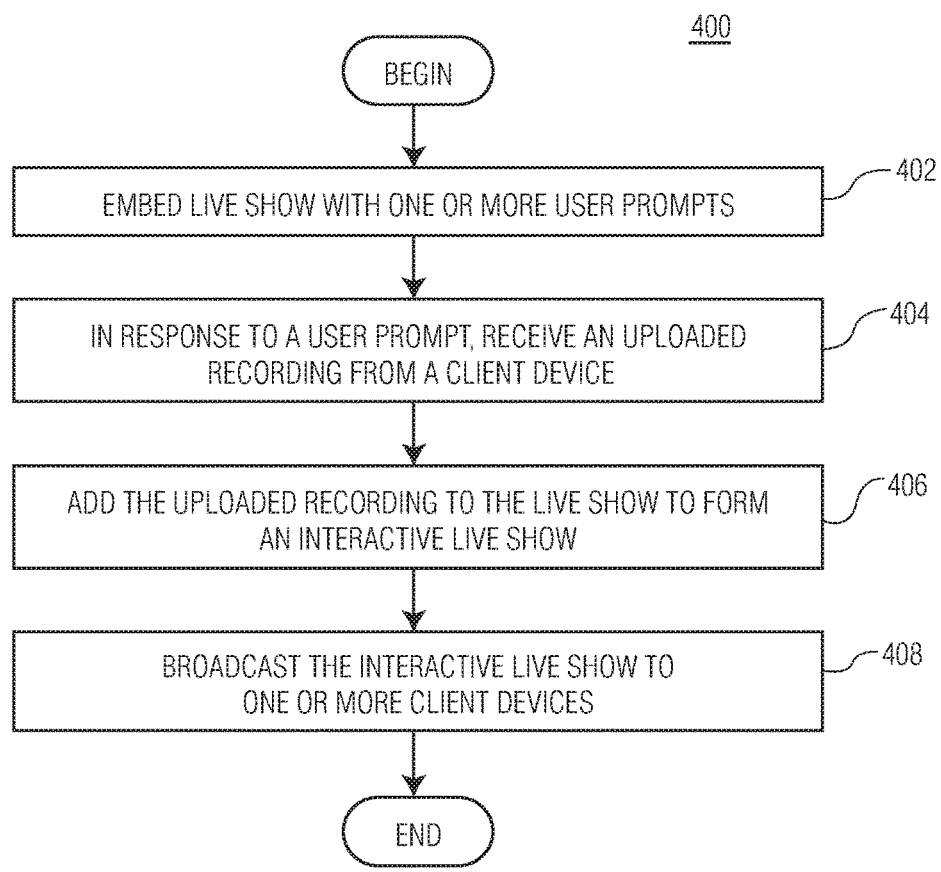
FIG. 4 is a flow diagram illustrating an example method of generating an interactive live show, according to example embodiments.

FIG. 4 is a flow diagram illustrating an example method 400 of generating an interactive live program, according to example embodiments. Method 400 may begin at step 402.

At step 402, interactive programming system 104 may embed live broadcast program 116 with one or more user invitations and/or prompts. For example, interactive programming system 104 may overlay on top of live broadcast program 116 one or more hyperlinks, messages, videos, or actionable graphical elements that may invite or prompt a user to participate in live broadcast program 116. Each invitation and/or prompt may be associated with metadata that instructs listener application 114 to generate one or more graphical elements corresponding to the invitation(s) and/or prompt(s). Participation in live broadcast program 116 may include the user recording audio and/or visual data to be injected into live broadcast program 116.

At step 404, interactive programming system 104 may receive a recording from client device 102. For example, in response to an invitation and/or prompt in the live broadcast program 116, client device 102 may record one or more streams of audio and/or visual data, and upload the recording to interactive programming system 104. In some embodiments, client device 102 may upload the recording to interactive programming system 104 via application 108 executing thereon.

At step 406, interactive programming system 104 may add the uploaded video to the live broadcast program. For example, interactive programming system 104 may create a playlist that includes at least the recording uploaded by client device 102 (in step 404). In some embodiments, the playlist may include one or more additional recordings uploaded by other users or client devices 102. Interactive programming system 104 may reformat and/or process the recordings such that the recordings are compatible with the live broadcast program.

At step 408, interactive programming system 104 may facilitate broadcasting interactive live program 116 to client device(s) 102. For example, interactive programming system 104 may create a new programming segment to be included in still-playing live broadcast program 116. The new programming segment may include the one or more recordings corresponding to the generated playlist. To broadcast interactive live program 116 with the new programming segment, interactive programming system 104 may transmit the new programming segment to one or more distribution platforms 106. Distribution platform(s) 106 may broadcast the new programming segment to one or more client device(s) 102 and/or controller 124.

Figure 5:
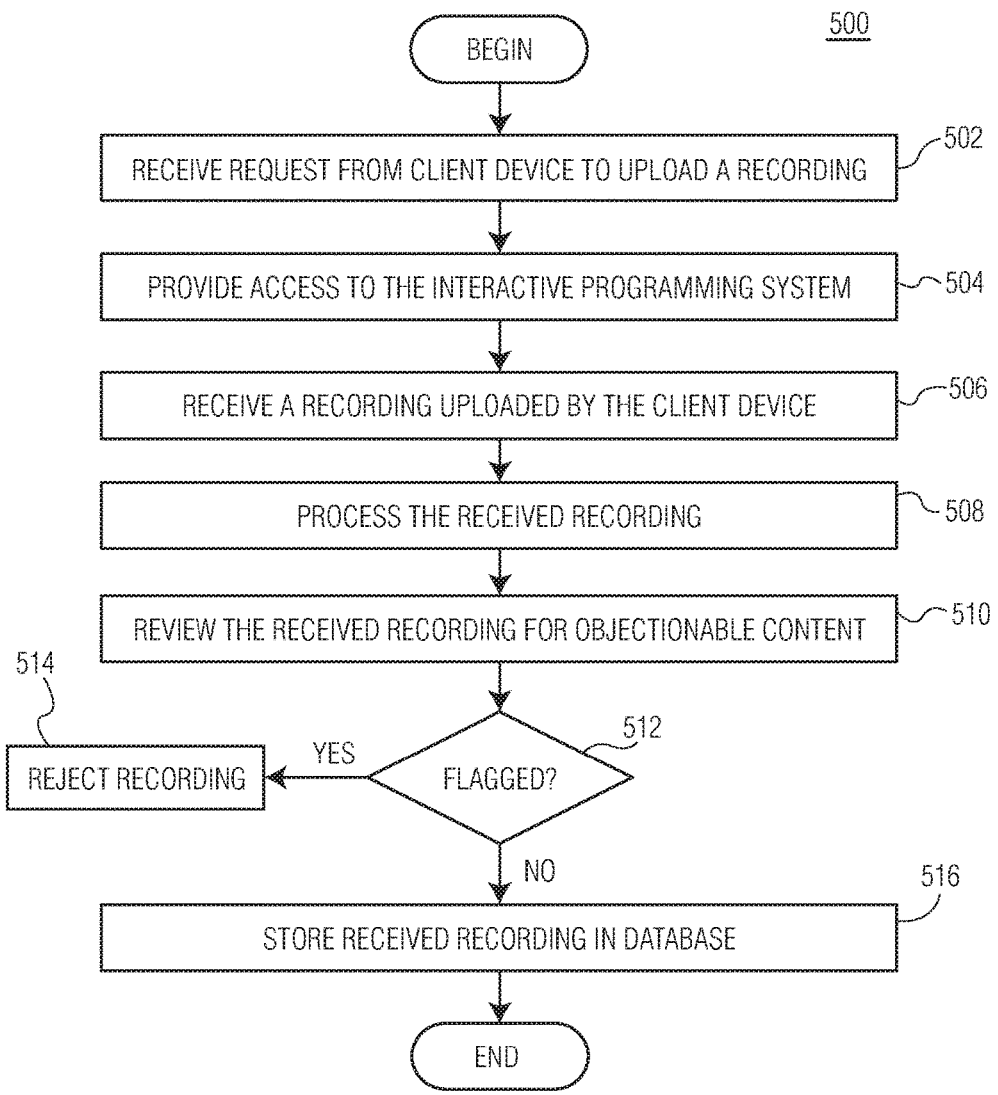
FIG. 5 is a flow diagram illustrating an example method of managing an interactive live show, according to example embodiments.

FIG. 5 is a flow diagram illustrating an example method 500 of facilitating interactive live program 116, according to example embodiments. Method 500 may begin at step 502.

At step 502, interactive programming system 104 may receive a request from client device 102 to participate in interactive live program 116. For example, interactive programming system 104 may receive a hypertext transfer protocol (HTTP) request from client device 102 to upload a recording, where the HTTP request is responsive to the user selecting a hyperlink corresponding to an invitation or prompt in interactive live program 116. The invitation or prompt may encourage a user to participate in the live program.

At step 504, interactive system 104 may provide client device 102 with access to interactive programing system 104. For example, responsive to the request, interactive programming system 104 may make available to client device 102 uploading functionality via application 108. Application 108 may allow end users to upload one or more recordings for inclusion in interactive live program 116. For example, via application 108, the user may upload and edit the recording.

At step 506, interactive programming system 104 may receive the recording uploaded by client device 102. For example, interactive programming system 104 may receive the recording uploaded by client device 102 via one or more APIs that link application 108 to interactive programming system 104.

At step 508, interactive programming system 104 may process the recording. For example, ingest server 202 may analyze, normalize, and store the recording. Ingest server 202 may further determine whether a recording should be added to video storage database 214 for display on one or more display devices 111.

At step 510, interactive programming system 104 may review the recording for objectionable content. In some embodiments, reviewing the recording for objectionable content includes interactive programming system 104 making the recording available to one or more third party administrators. In some embodiments, reviewing the recording for objectionable content may include an artificial intelligence moderator reviewing the recording.

At step 512, interactive programming system 104 may identify whether the recording was flagged as containing objectionable content. If, at step 512, interactive programming system 104 determines that the recording was flagged, then at step 514, interactive programming system 104 may reject the recording. In other words, interactive programming system 104 does not include the recording into still-playing live program 116.

If, however, at step 512, interactive programming system 104 determines that the recording was not flagged (i.e., the recording does not include objectionable content), then method 500 proceeds to step 516. At step 516, interactive programming system 104 may store the recording in database 214. The one or more recordings in database 214 may be subsequently used by interactive programming system 104 to create a playlist of recordings that may be added to still-playing live program 116.

Figure 6:
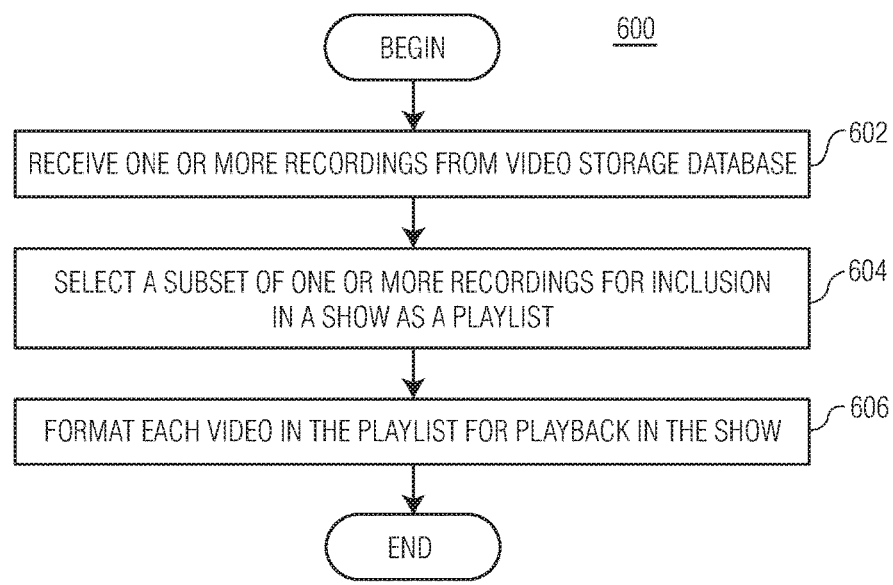
FIG. 6 is a flow diagram illustrating an example method of modifying an interactive live show, according to example embodiments.

FIG. 6 is a flow diagram illustrating an example method 600 of generating a playlist for inclusion in still-playing live program 116, according to example embodiments. Method 600 may begin at step 602.

At step 602, interactive programming system 104 may receive one or more recordings from database 214. For example, interactive programming system 104 may receive one or more recordings from database 214 to generate a playlist for inclusion in still-playing interactive live broadcast 116. In some embodiments, show creation server 204 may query database 214 to retrieve one or more recordings from database 214. The query may include one or more constraints specific to the still-playing interactive live broadcast. For example, in a sports news program, one or more constraints may be: "sports," "basketball," "athletics," "fitness," and the like.

At step 604, interactive programming system 104 may select a subset of one or more recordings to generate a playlist. For example, show creation server 204 may analyze one or more recordings to identify a subset of recordings to include in the playlist. In some embodiments, show creation server 204 may attempt to identify one or more recordings from opposing viewpoints. For example, in a news broadcast, show creation server 204 may attempt to identify a first recording in favor of a policy and a second recording against the policy.

At step 606, interactive programming system 104 may format each video in the playlist for playback in still-playing interactive live broadcast 116. For example, show creation server 204 may generate one or more screens of new content to be added to still-playing interactive live program 116. Show creation server 204 may encode the generated shows as high quality video and/or audio and push the generated high quality video to one or more streaming servers 206.

Figure 7:
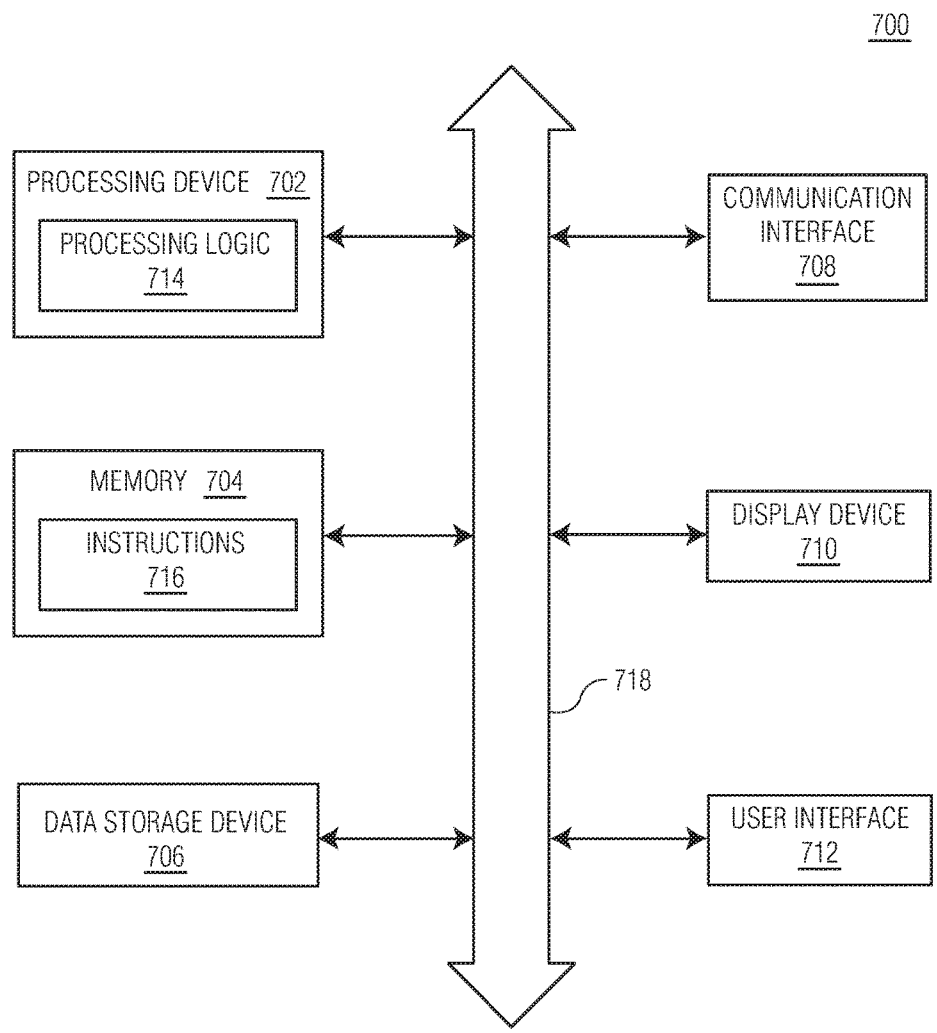
FIG. 7 is functional block diagram illustrating an example computing device, according to example embodiments.

FIG. 7 illustrates a functional block diagram of a machine in the example form of computer system 700, within which a set of instructions for causing the machine to perform any one or more of the methodologies, processes, or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of ingest server 202, show creation server 204, and streaming server 206 may be implemented by the example machine shown in FIG. 7 (or a combination of two or more of such machines). In some examples, each of client device 102 and controller 124 may be implemented by the example machine shown in FIG. 7 (or a combination of two or more of such machines).

Example computer system 700 may include processing device 702, memory 704, data storage device 706, and communication interface 708, which may communicate with each other via data and control bus 718. In some examples, computer system 700 may also include display device 710 and/or user interface 712.

Processing device 702 may include, without being limited to, a microprocessor, a central processing unit, an application specific integrated circuit (ASIC), a field programmable gate array (FPGA), a digital signal processor (DSP) and/or a network processor. Processing device 702 may be configured to execute processing logic 714 for performing the operations described herein. In general, processing device 702 may include any suitable special-purpose processing device specially programmed with processing logic 714 to perform the operations described herein.

Memory 704 may include, for example, without being limited to, at least one of a read-only memory (ROM), a random access memory (RAM), a flash memory, a dynamic RAM (DRAM) and a static RAM (SRAM), storing computer-readable instructions 716 executable by processing device 702. In general, memory 704 may include any suitable non-transitory computer readable storage medium storing computer-readable instructions 716 executable by processing device 702 for performing the operations described herein. Although one memory device 704 is illustrated in FIG. 7, in some examples, computer system 700 may include two or more memory devices (e.g., dynamic memory and static memory).

Computer system 700 may include communication interface device 708, for direct communication with other computers (including wired and/or wireless communication), and/or for communication with a network. In some examples, computer system 700 may include display device 710 (e.g., a liquid crystal display (LCD), a touch sensitive display, etc.). In some examples, computer system 700 may include user interface 712 (e.g., an alphanumeric input device, a cursor control device, etc.).

In some examples, computer system 700 may include data storage device 706 storing instructions (e.g., software) for performing any one or more of the functions described herein. Data storage device 706 may include any suitable non-transitory computer-readable storage medium, including, without being limited to, solid-state memories, optical media, and magnetic media.

Figure 8A:
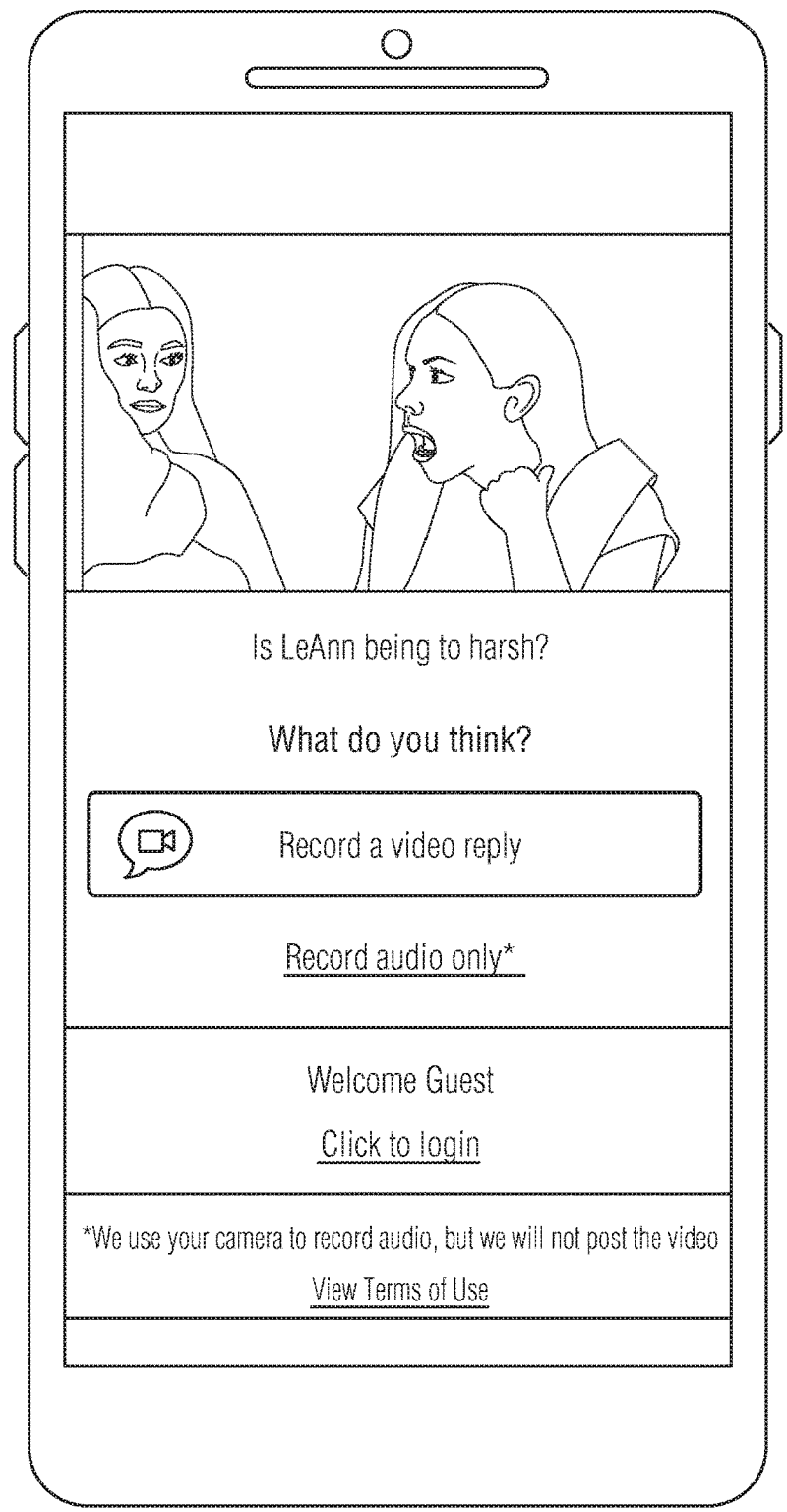
FIGS. 8A, 8B, 8C, and 8D illustrates one or more screenshots of an interactive live broadcast program, according to example embodiments.
Figure 8B:
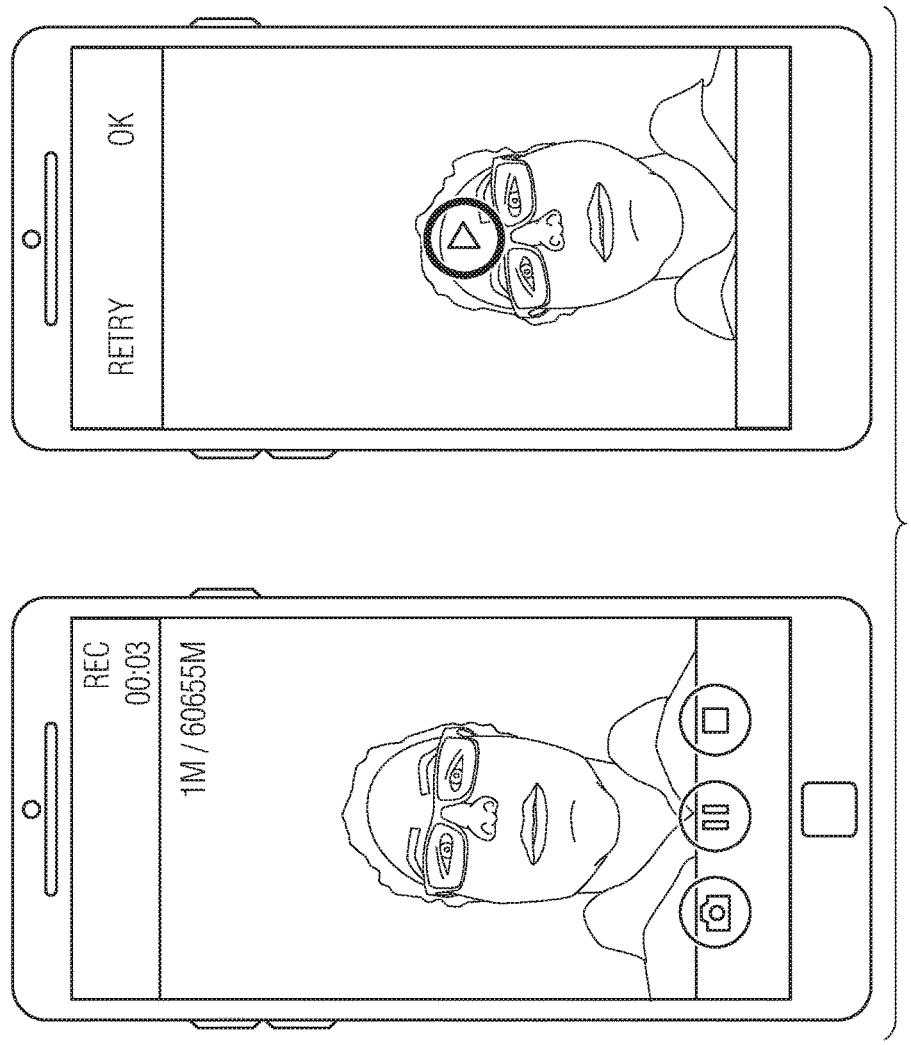
Figure 8C:
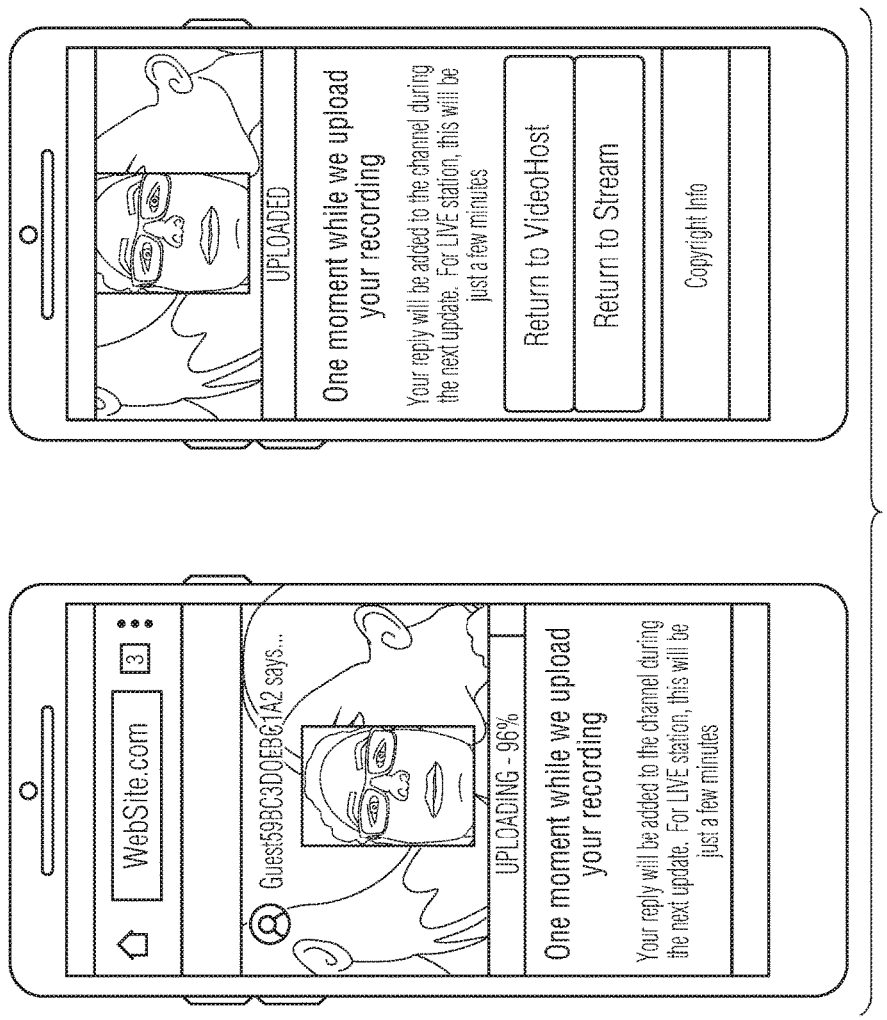
Figure 8D:
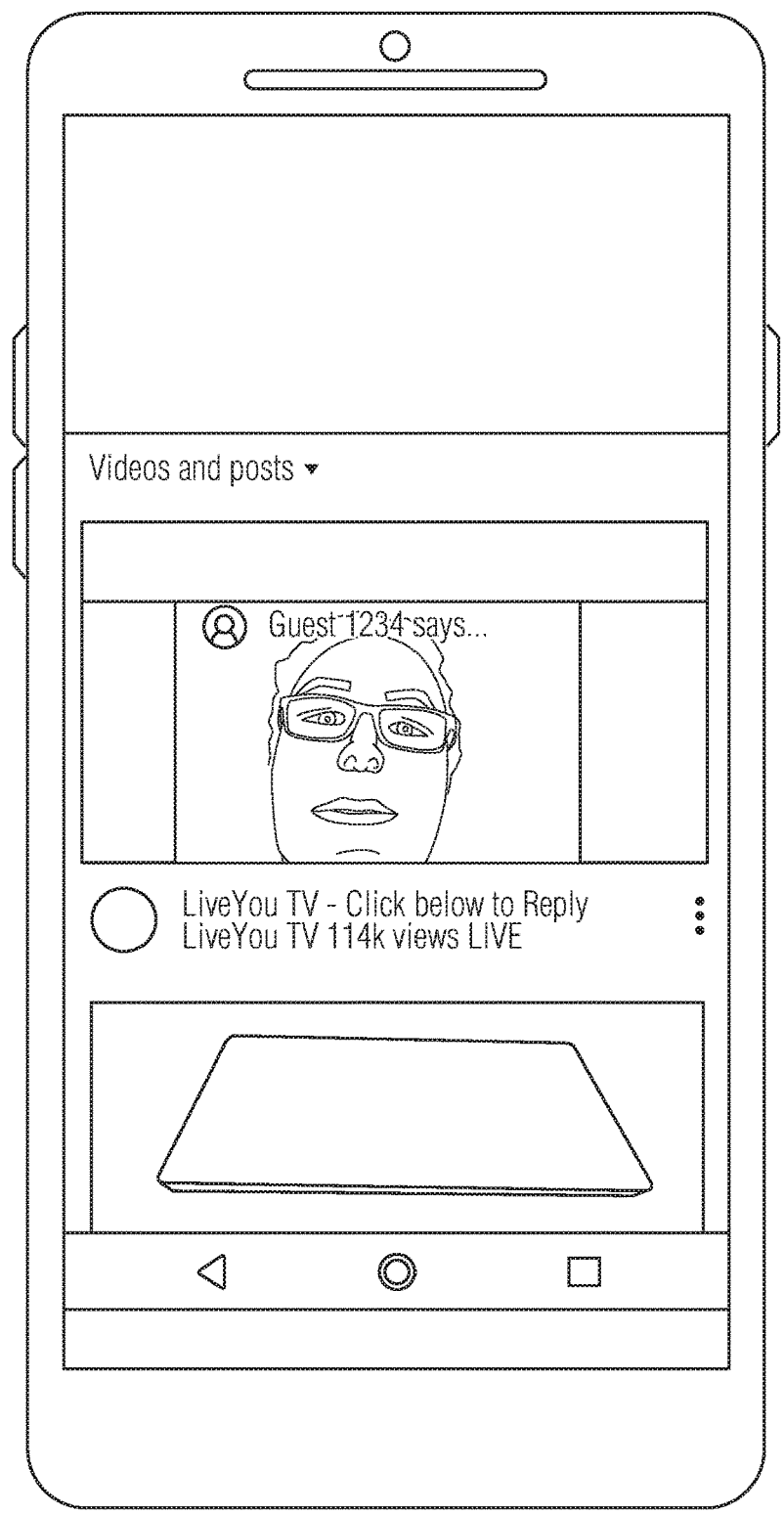

We turn now to FIGS. 8A-8D, which illustrate an example of an application built in accordance with the systems and methods described herein. As illustrated, an application on a mobile device may include a graphical user interface that displays a video recording (and/or an image) and a prompt to a user via a distribution platform (see FIG. 8A). The user may then elect to respond to the prompt by selecting whether they want to respond via a video, or audio. The user may also be prompted to enter login information in order to verify their credentials. As illustrated in FIG. 8B, the user may record, preview, and/or edit their response. As illustrated in FIG. 8C, the user's recording may be uploaded for post-processing, moderation, and the like, in accordance with the systems and methods described above. The user's video may then be distributed via the distribution channel (e.g., YouTube) as is illustrated in FIG. 8D.

Figure 9C:
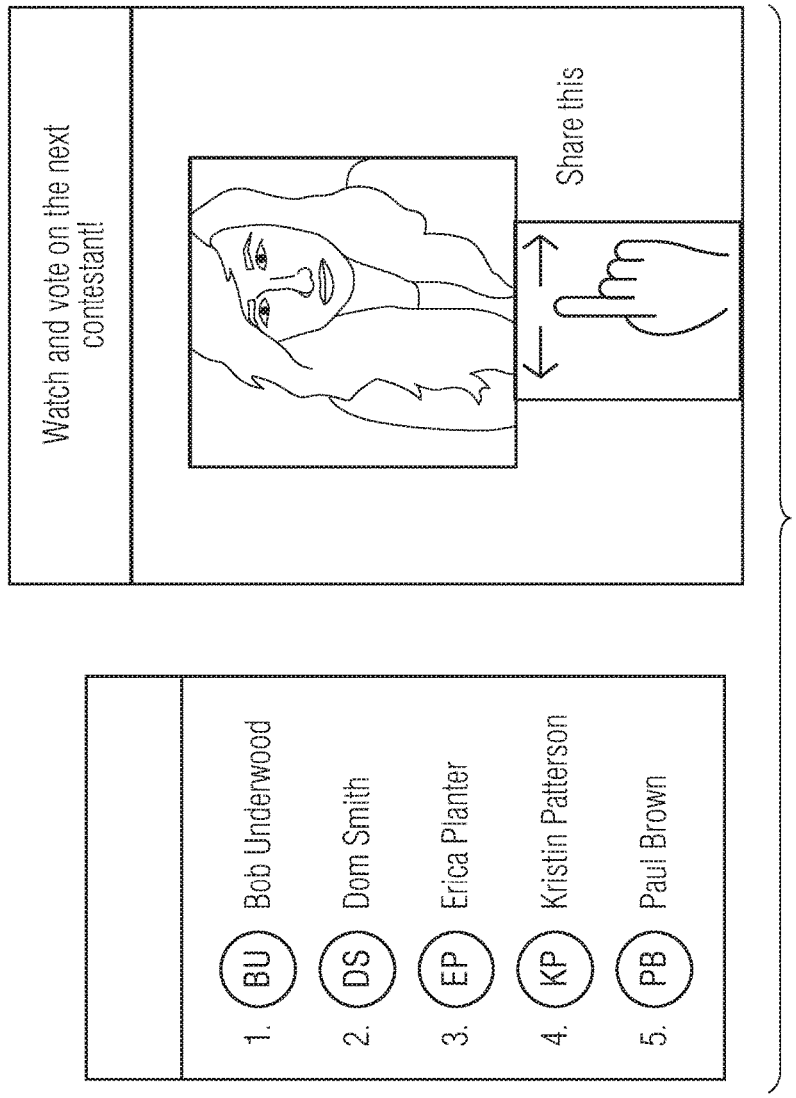
Figure 9E:
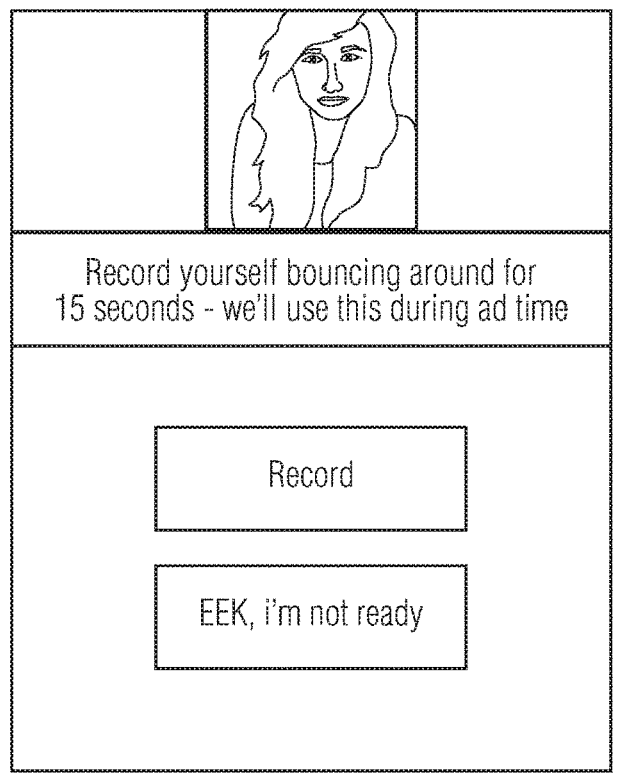
Figure 9F:
Figure 9G:
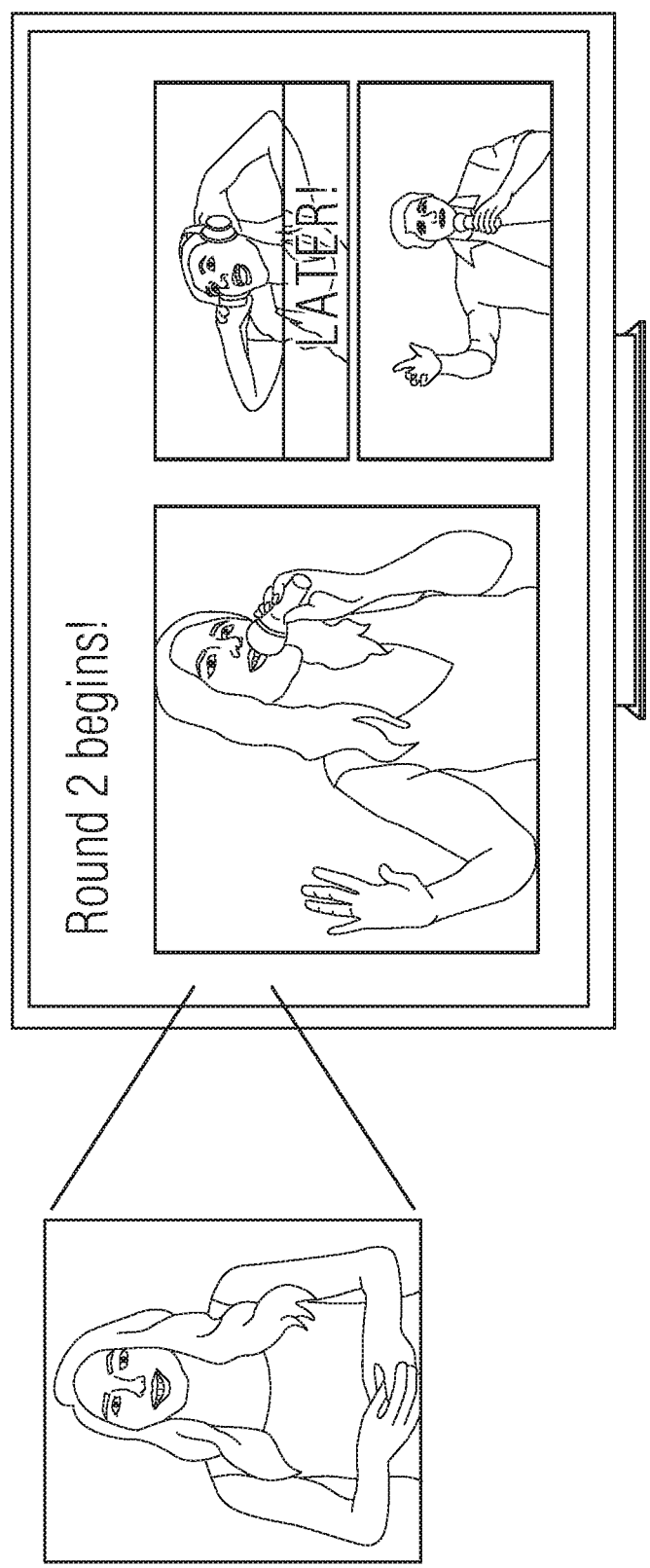
Figure 9H:
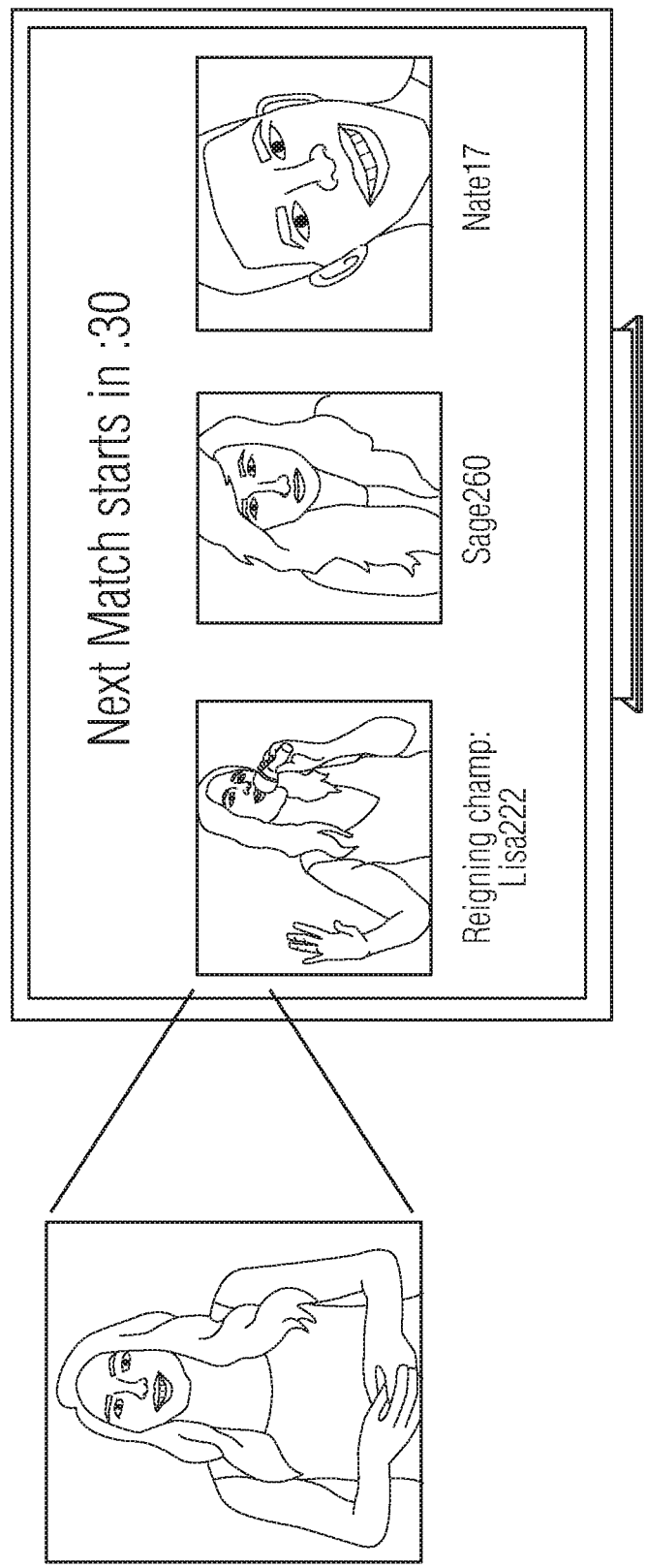

We turn now to FIGS. 9A-9H, which illustrate an example of an application built in accordance with the systems and methods described herein. The illustrated example is of a talent show, where viewers may interactively vote for contestants. As illustrated in FIG. 9A, the audience may view the talent show on a first screen, and vote on a user input device, such as a mobile device. The audience may also record their own videos using a mobile device, application, or website. Users may watch on their TVs, PCs, Chromecast, Comcast boxes, mobile devices, and the like. As illustrated in FIG. 9B, the audience may rate contestant members, to determine which contestant moves on to the next round. FIG. 9C illustrates a leaderboard that ranks both the audience member and the contestants. As illustrated in FIG. 9D, an audience member may be invited to be a contestant. If an audience member elects to participate, they may be invited to record a video of themselves as is illustrated in FIG. 9E. Advertisement and education interstitials may be used, as illustrated in FIG. 9F. Interstitials may be used to separate rounds of a talent show as illustrated in FIG. 9G. The winner of the talent show may be displayed, as illustrated in FIG. 9H.

Figure 10A:
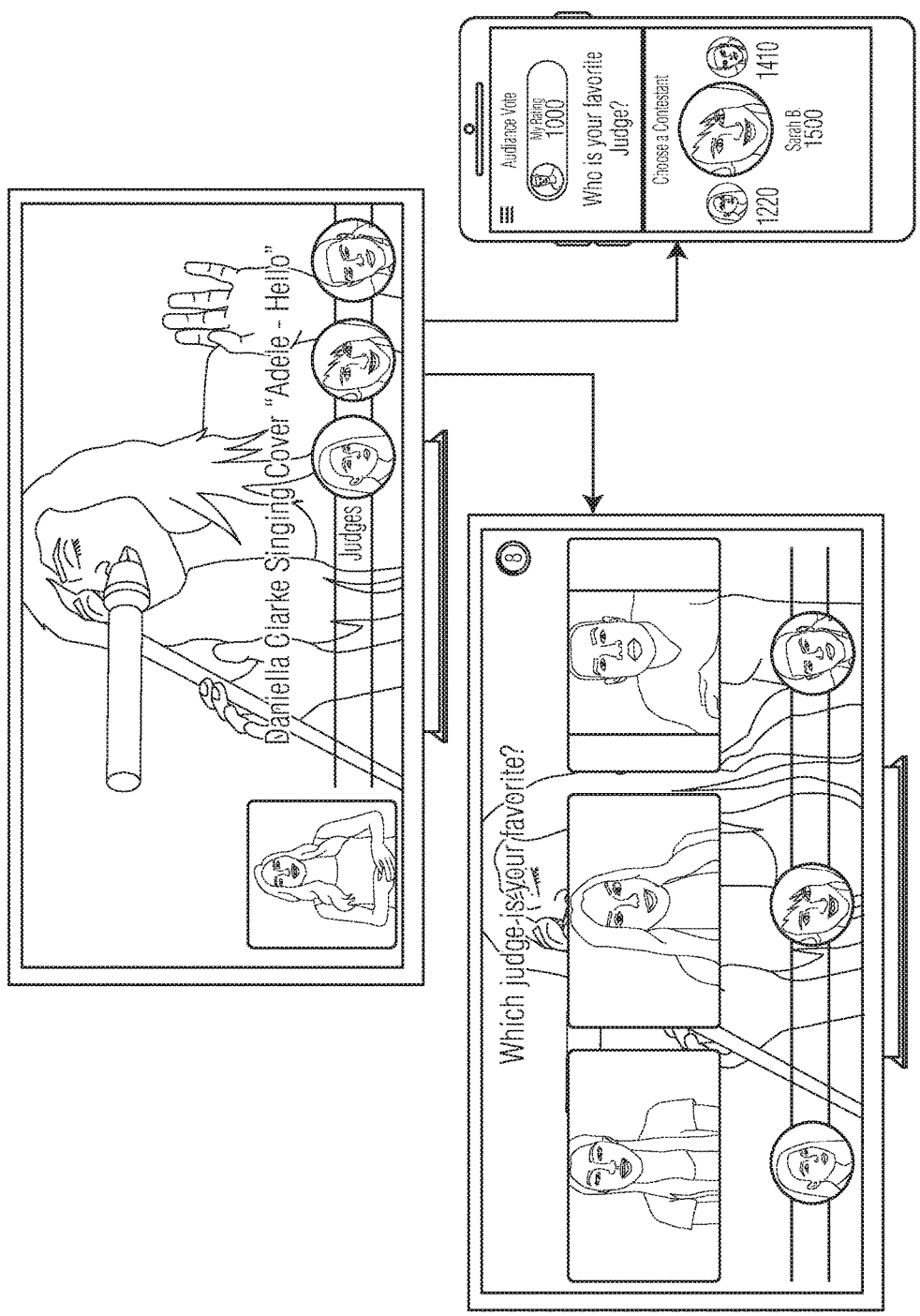
FIGS. 10A, 10B, 10C, 10D, 10E, and 10F illustrate one or more screenshots of an interactive live broadcast program, according to example embodiments.
Figure 10B:
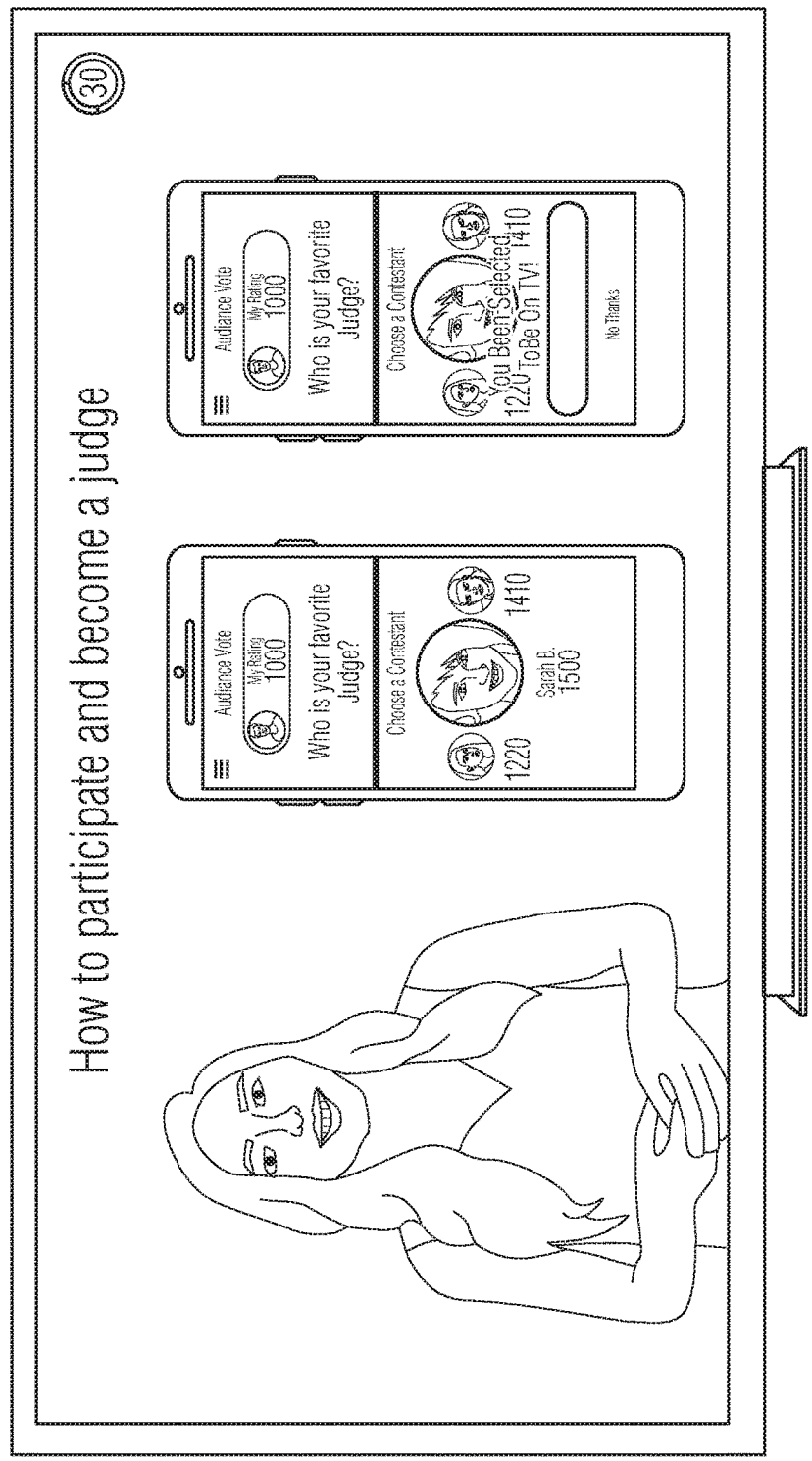
Figure 10C:
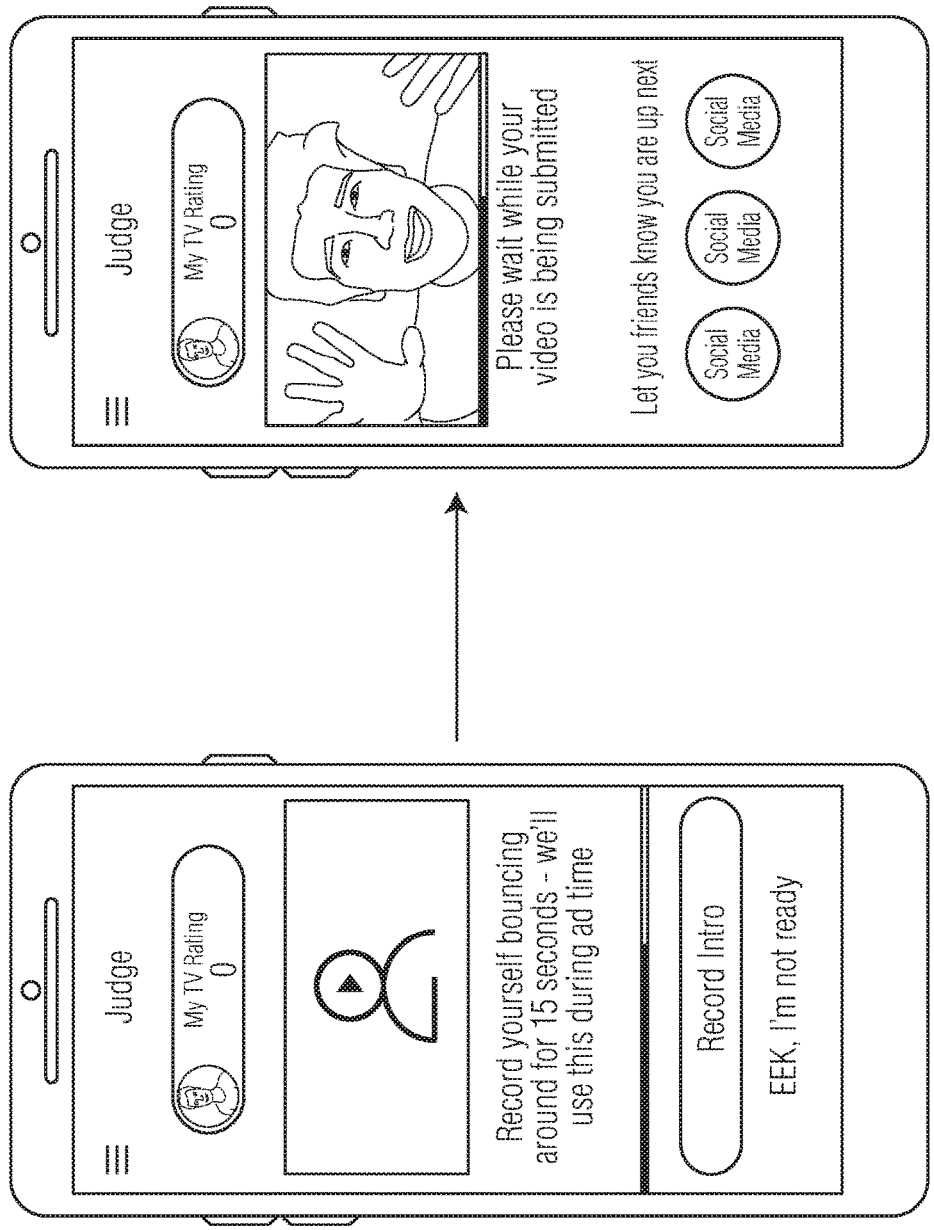
Figure 10D:
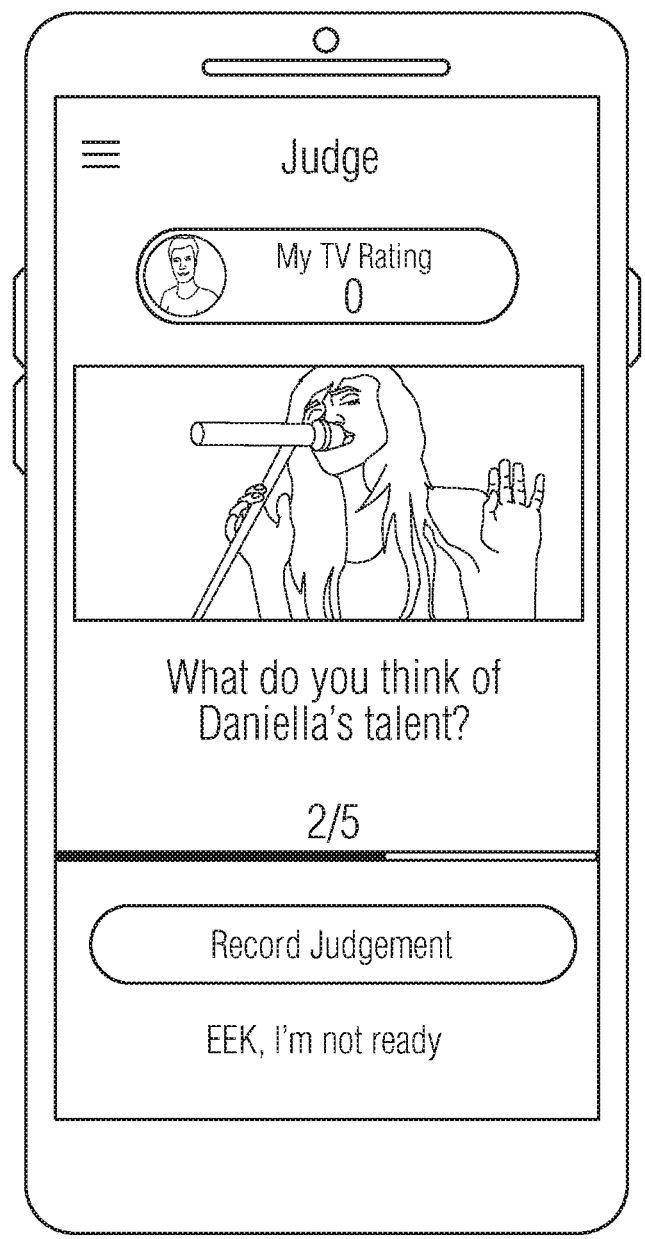
Figure 10E:
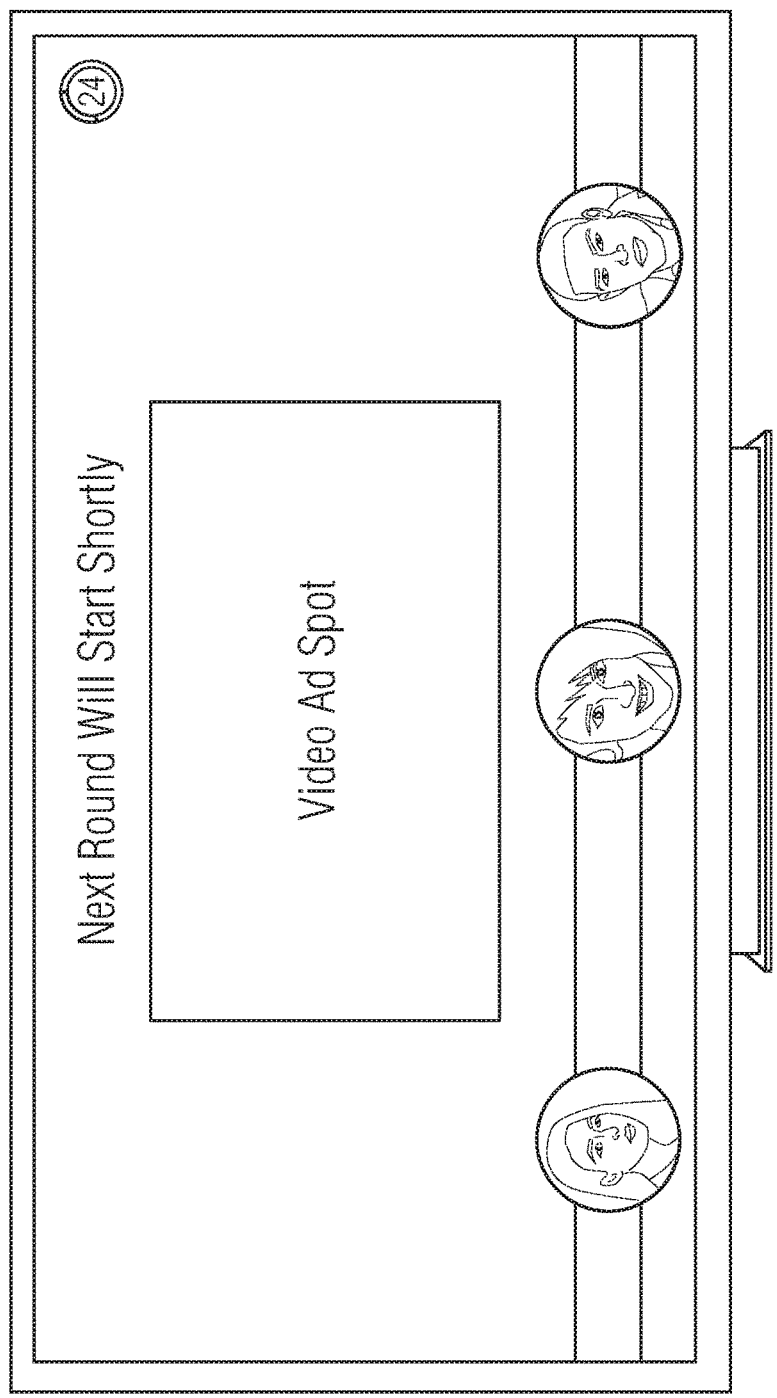
Figure 10F:
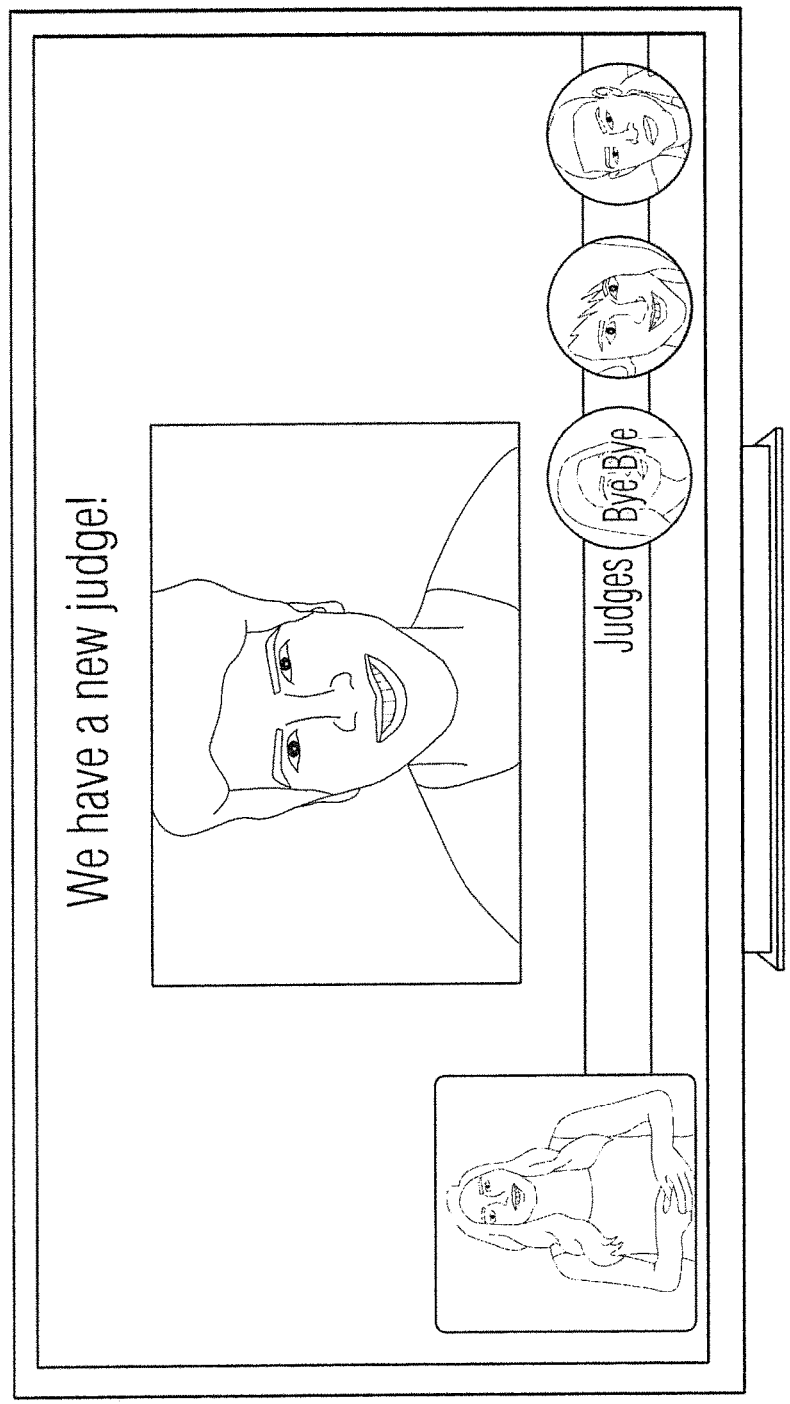

We turn now to FIGS. 10A-10F, which illustrate an example of an application built in accordance with the systems and methods described herein. In this example, judges who provide a review of a talent show may compete against each other and be ranked by an audience. For example, as illustrated in FIG. 10A, a viewer answers the question which judge was their favorite. The viewer may also elect to be a judge as is illustrated in FIG. 10B. A viewer may record a video (or audio) of themselves performing (as illustrated in FIG. 10C) or judging (as illustrated in FIG. 10D). The video of a user performing may be used to introduce the judge, as illustrated in FIG. 10F. Rounds of the contest may be separated by advertisements or interstitials such as that depicted in FIG. 10E.

Figure 11A:
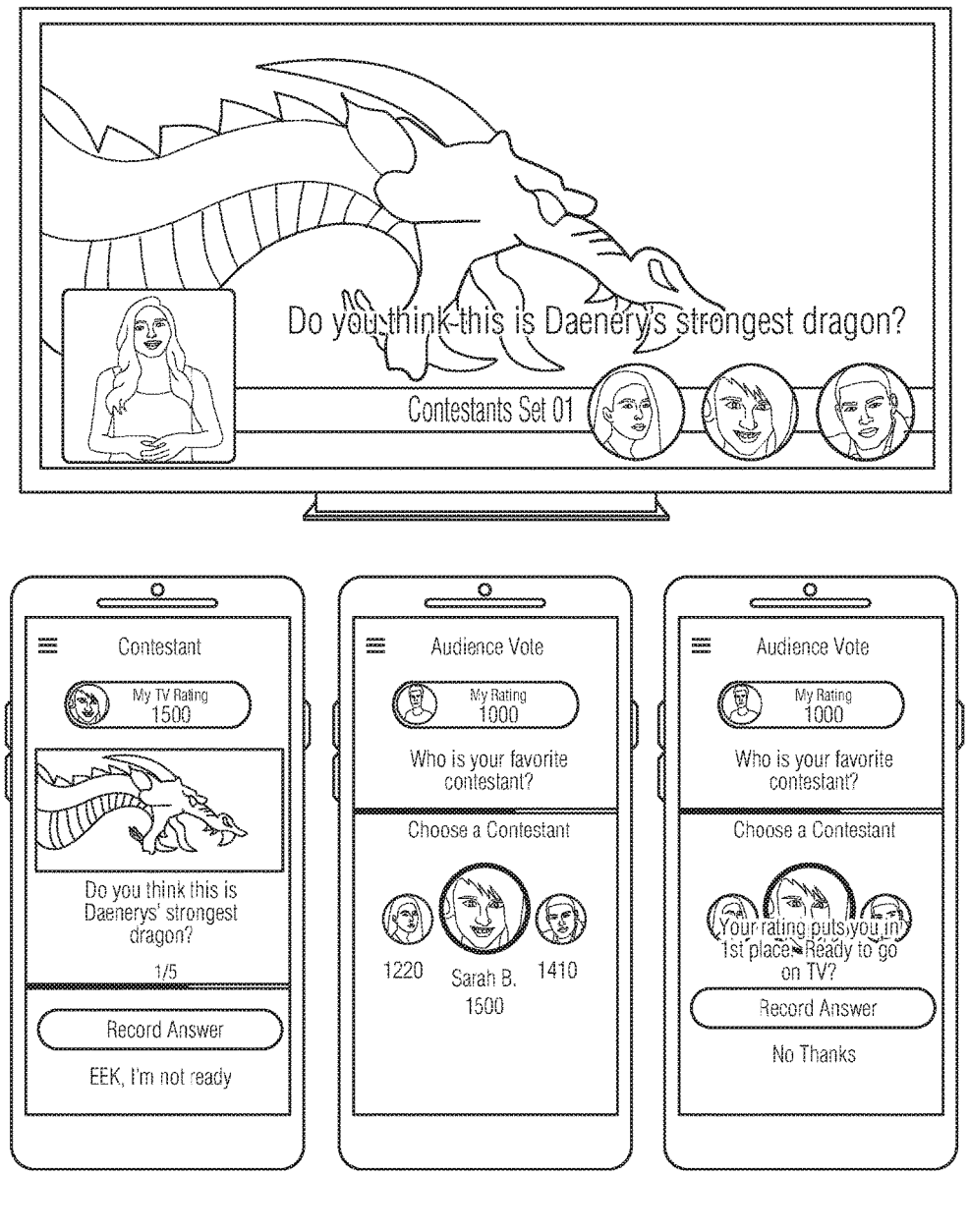
FIGS. 11A, 11B, 11C, 11D, 11E, 11F, and 11G illustrate one or more screenshots of an interactive live broadcast program, according to example embodiments.
Figure 11B:
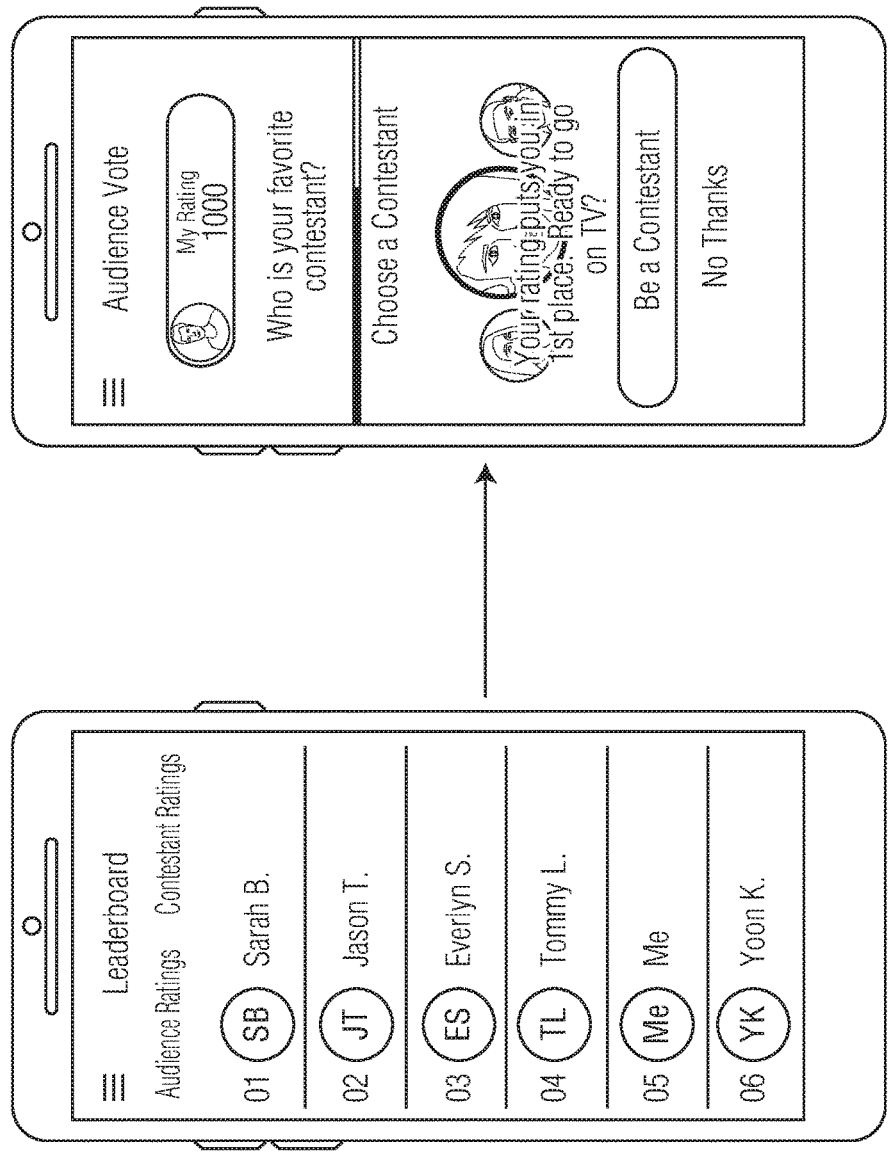
Figure 11C:
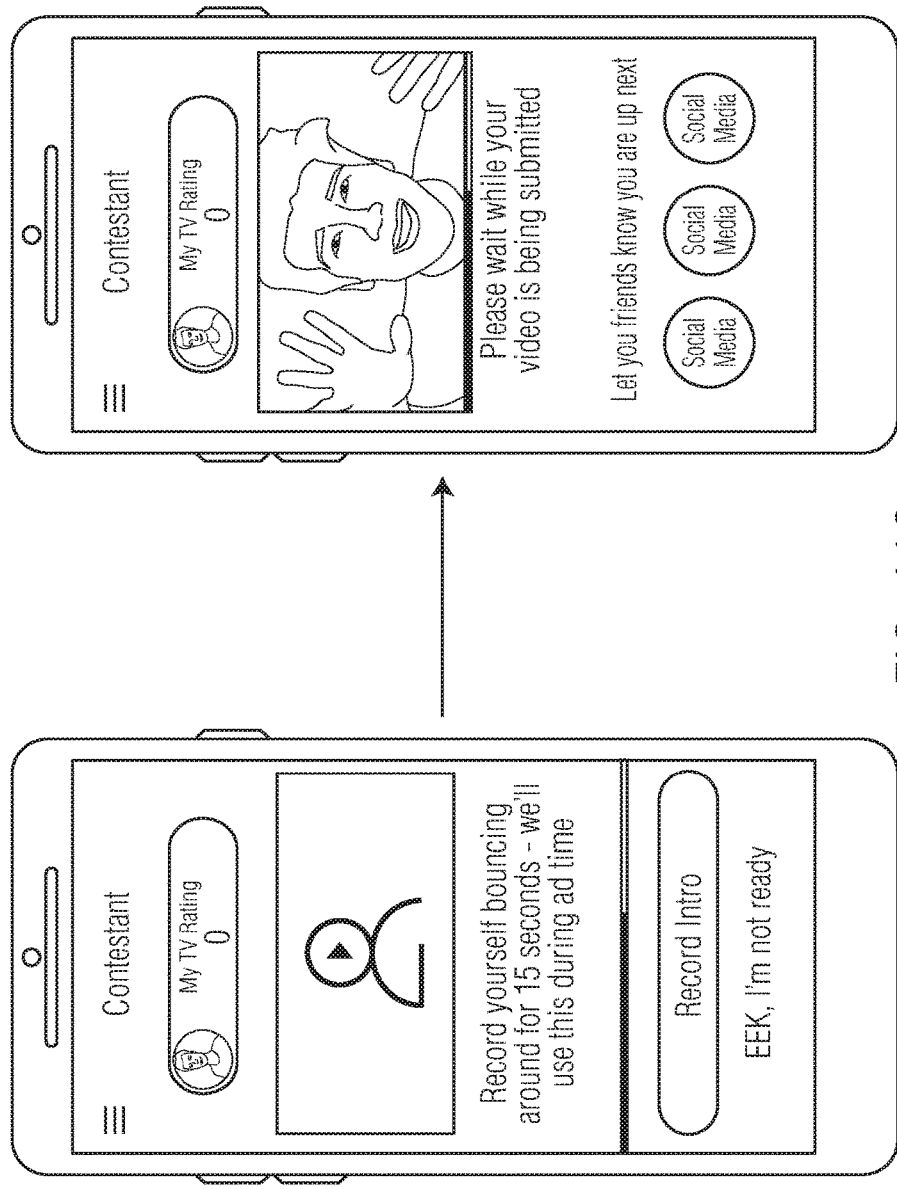
Figure 11D:
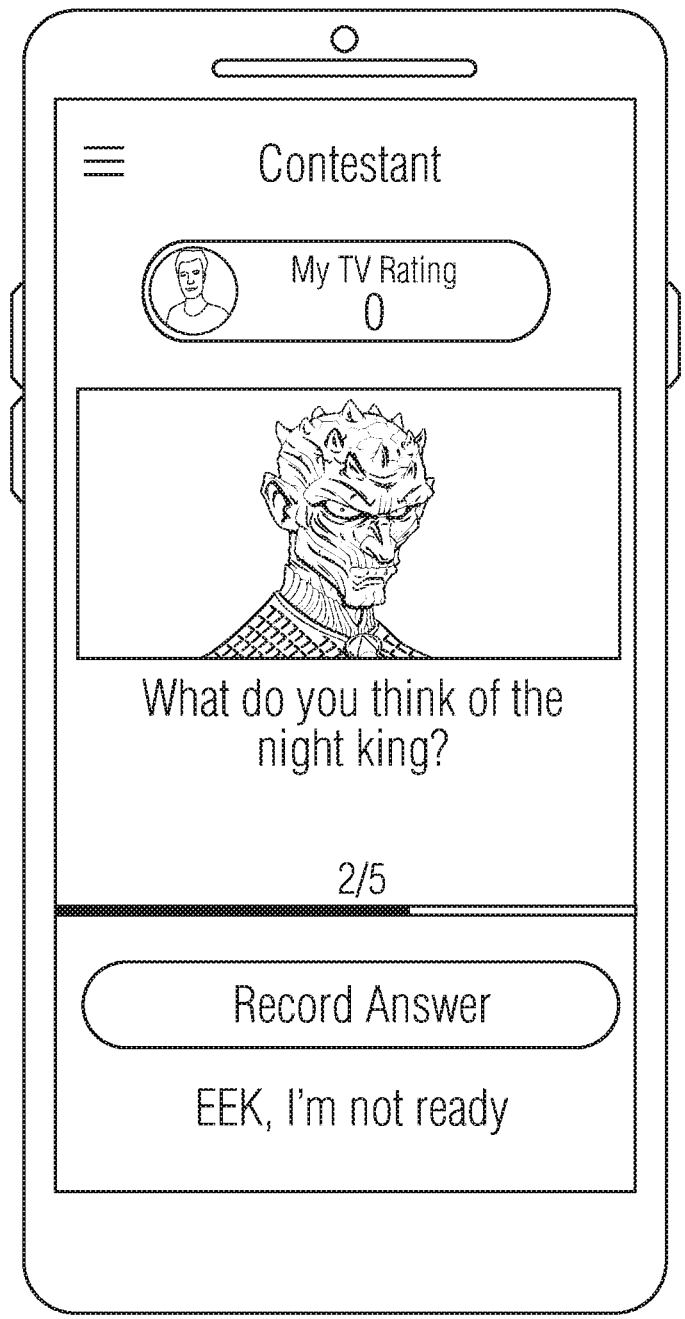
Figure 11E:
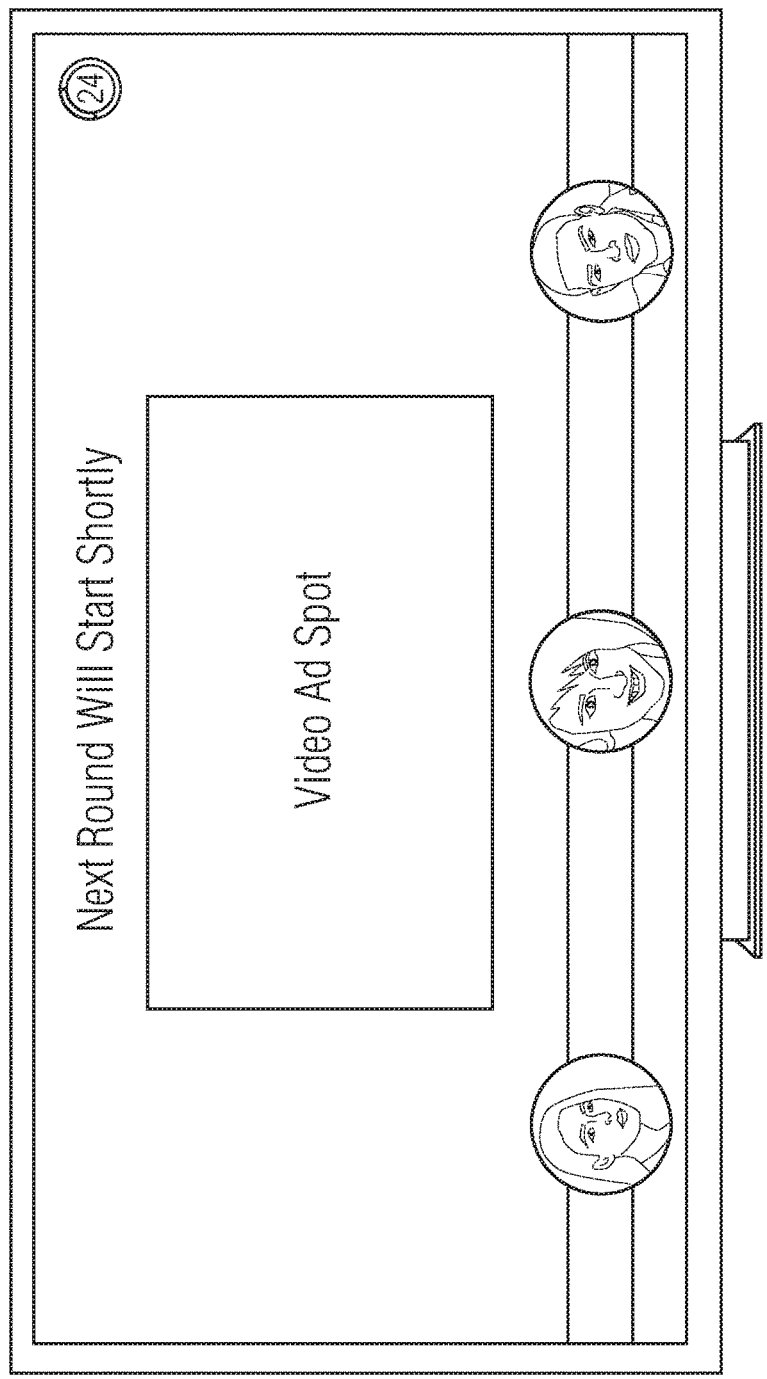
Figure 11F:
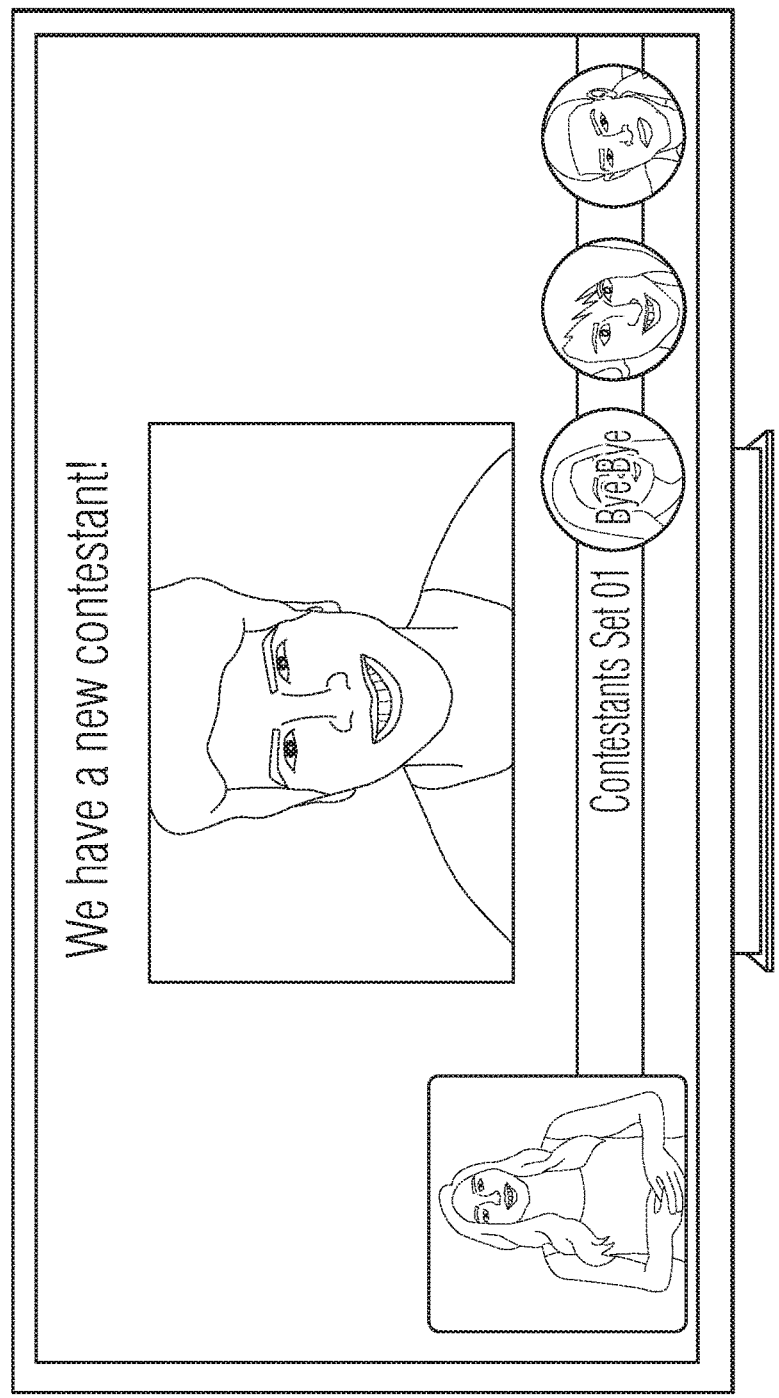
Figure 11G:
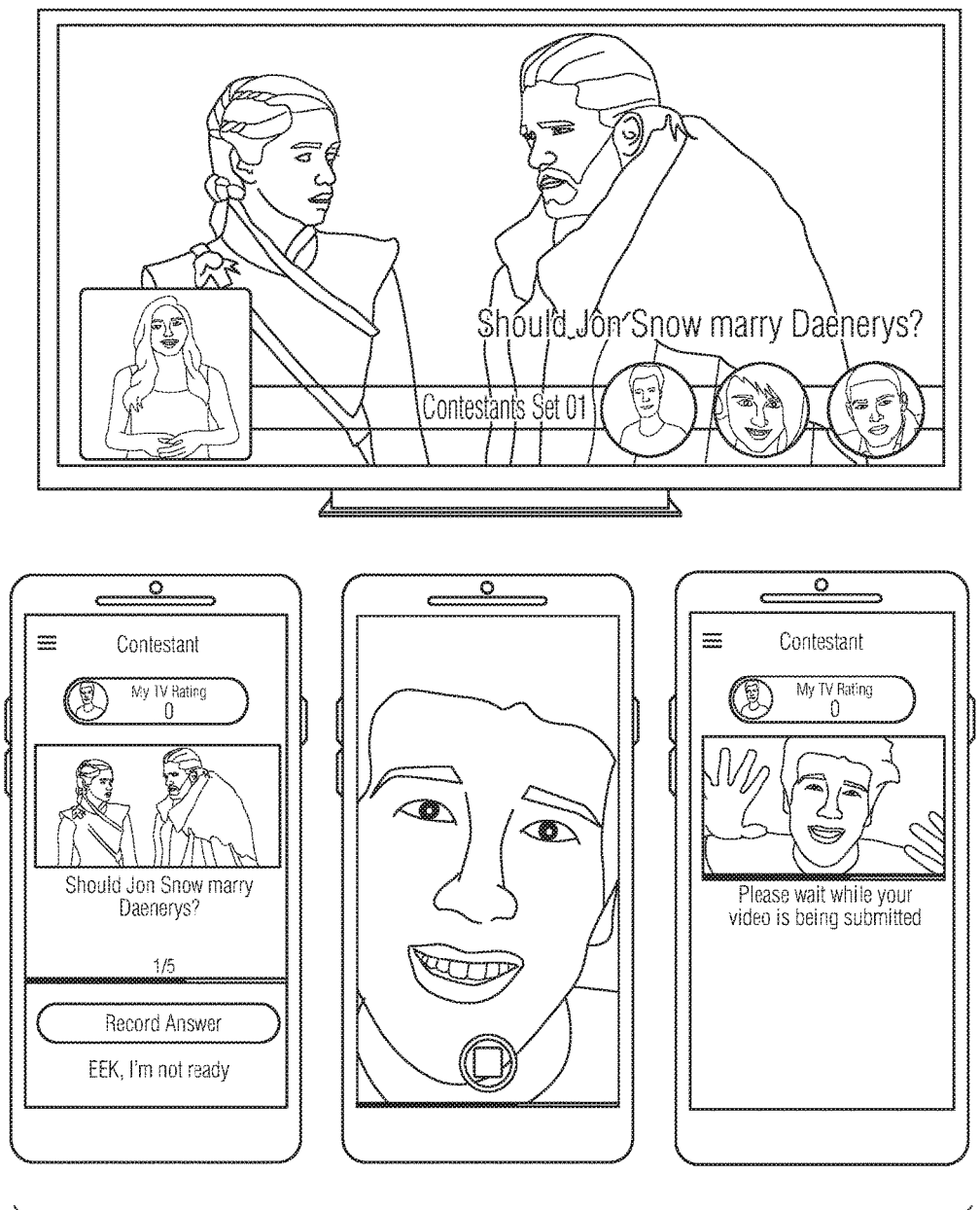

We turn now to FIGS. 11A-11G, which also illustrate an example of an application built in accordance with the systems and methods described herein. In this example, contestants may provide answers to a trivia question related to a television program. The contestants may then be ranked based on their answers. As illustrated in FIGS. 11A and 11B, contestants may be asked to answer who they think is Daenerys' strongest dragon, and viewers may chose/rank their favorite contestant. Contestant rankings may be visible in a leaderboard as is illustrated in FIG. 11B. A contestant may record a video introducing themselves (as illustrated in FIG. 11C) and a video (or audio) recording their answer to a question (as illustrated in FIG. 11D). The program may include one or more interstitials or advertisements, as illustrated in FIG. 11E. The contestant's introductory video may be displayed (as illustrated in FIG. 11F) along with their response to the question (as illustrated in FIG. 11G).

Figure 12A:
Figure 12B:
Figure 12C:
Figure 12D:
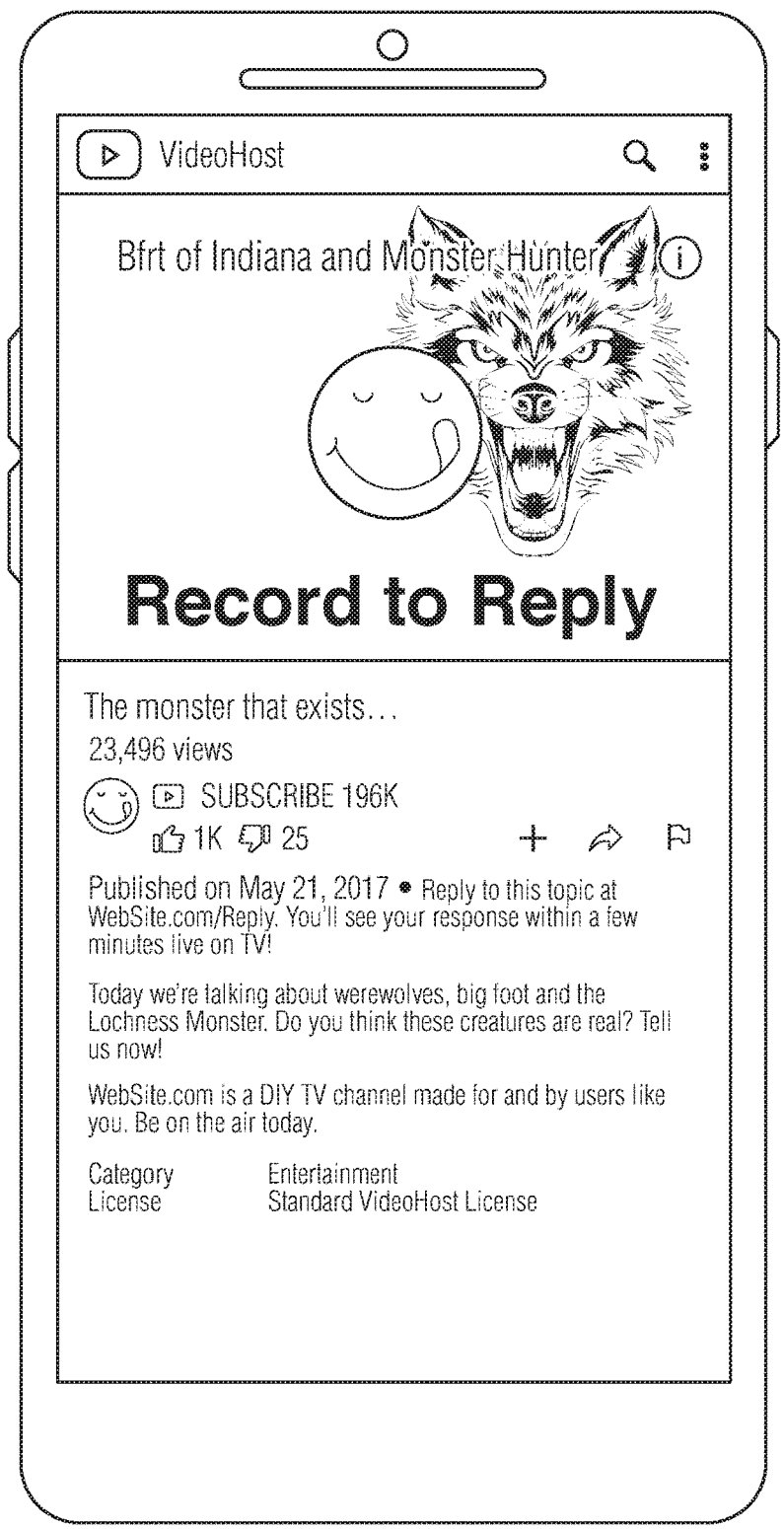
Figure 12E:
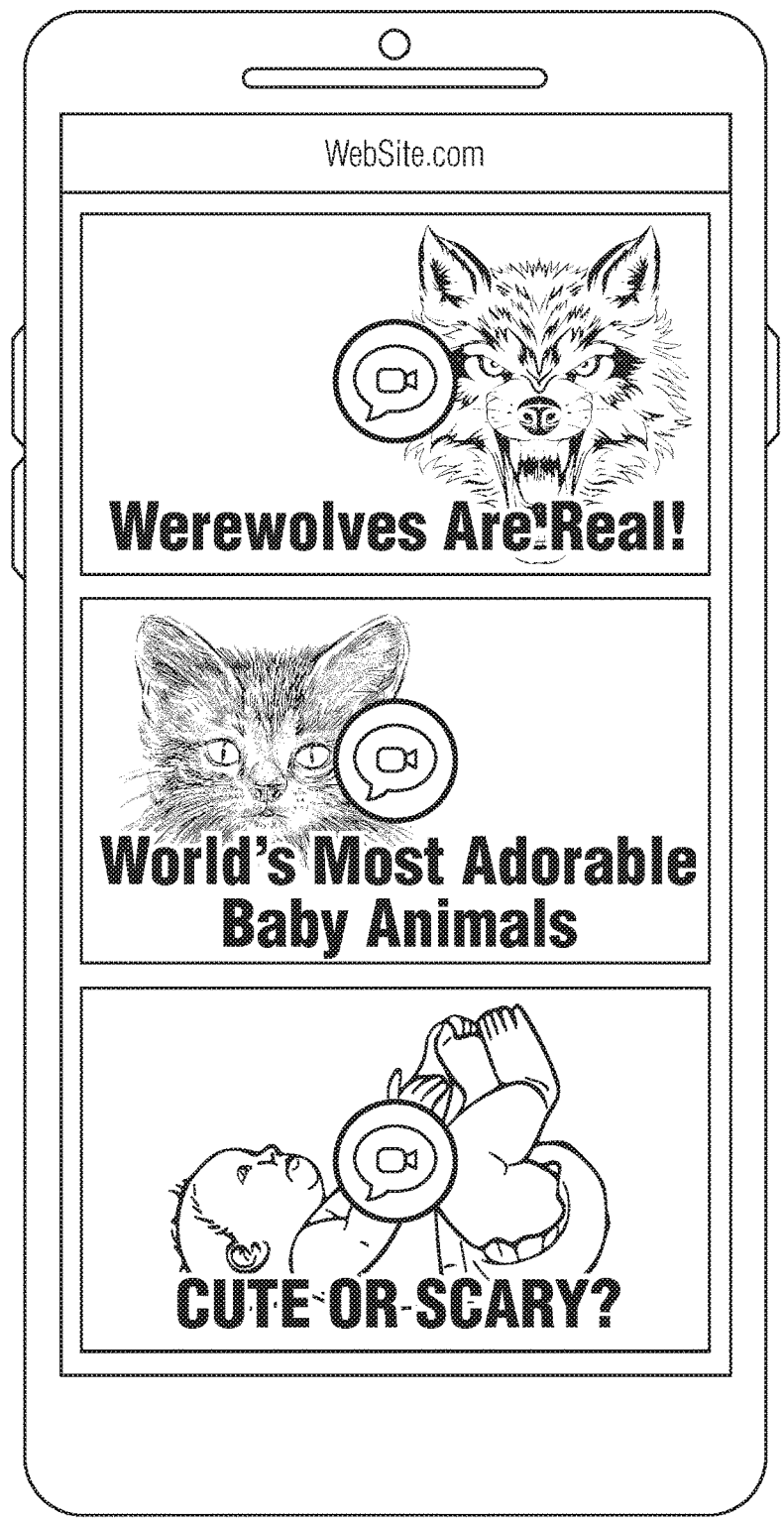
Figure 12F:
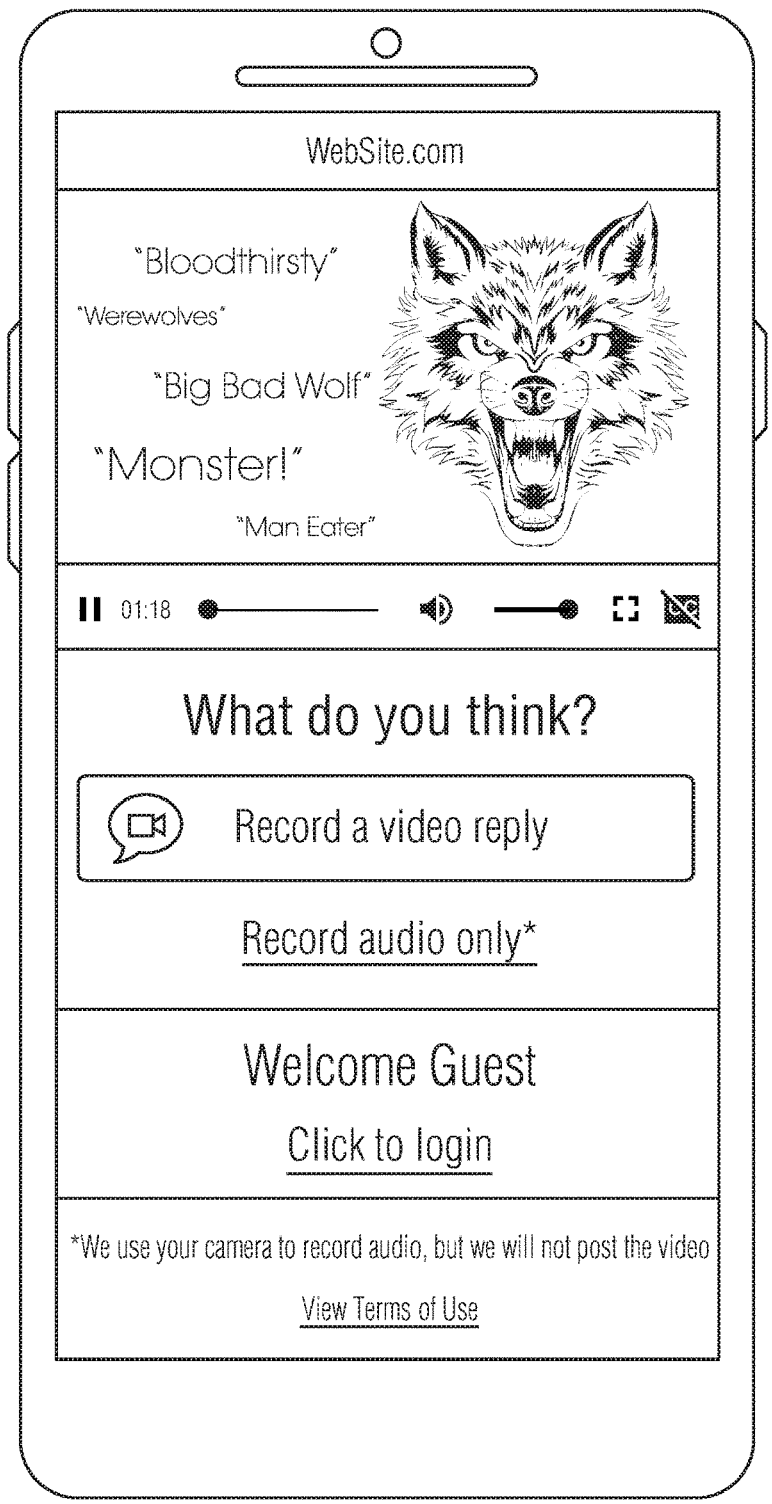
Figure 12G:
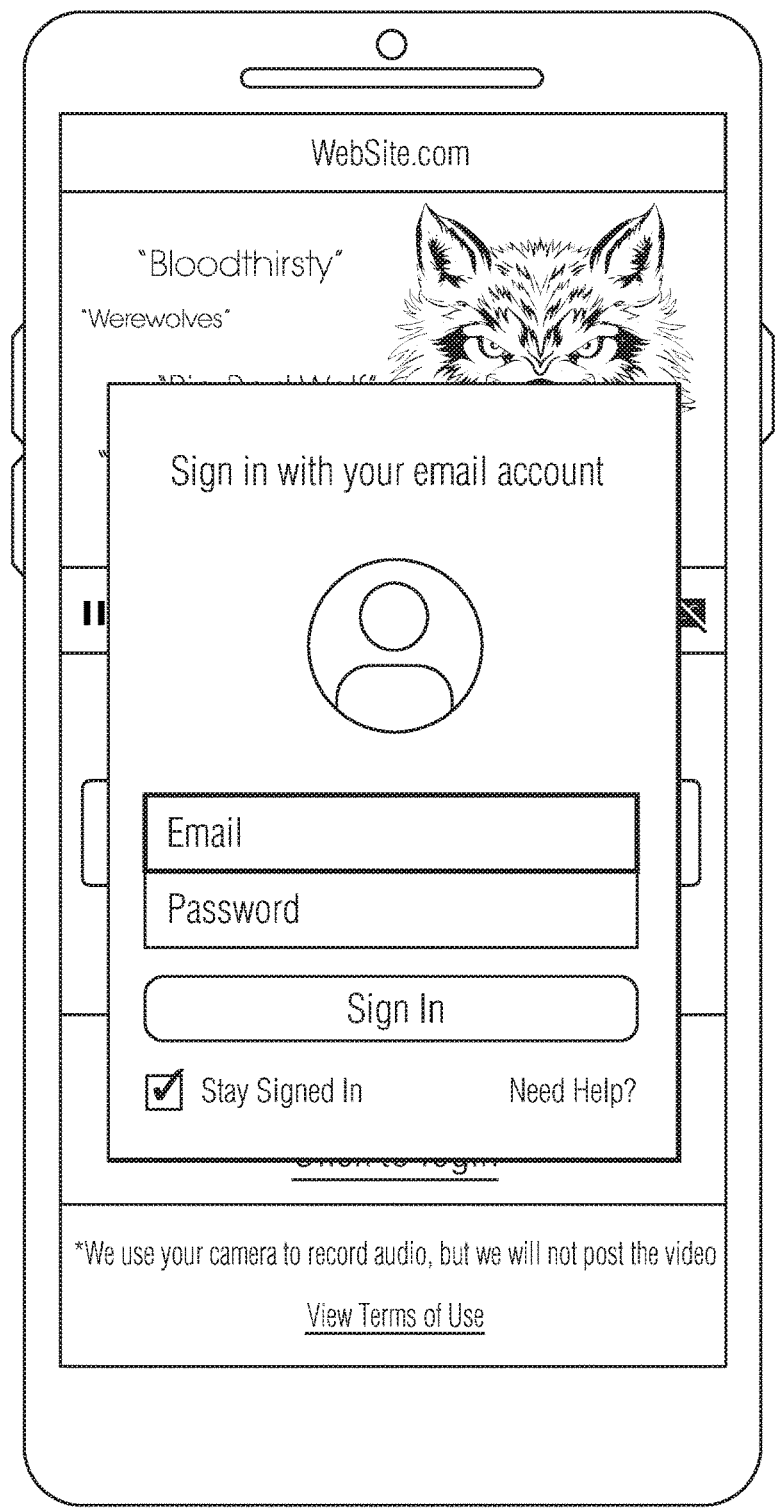

We turn now to FIGS. 12A-12K, which also illustrate an example of an application built in accordance with the systems and methods described herein. As illustrated in FIG. 12A, a viewer may view a program on a distribution channel such as YouTube. As illustrated in FIG. 12B, the viewer may be provided with a call to action or an option to interact (top banner) and a link that takes them to a recording platform (banner). As illustrated in FIG. 12C, the user may be provided with a question. As illustrated in FIG. 12D, after each topic, an interstitial may appear with audio overlay that prompts the user to respond to a topic. As illustrated in FIG. 12E, by clicking on the call to action or option to interact, the user may be routed to a landing page that allows the user to select the topic they wish to reply to. As illustrated in FIG. 12F, the user may be brought to a reply page to record a video or audio recording. The user may login or continue as a guest. An example login option is illustrated in FIG. 12G.

Figure 12H:
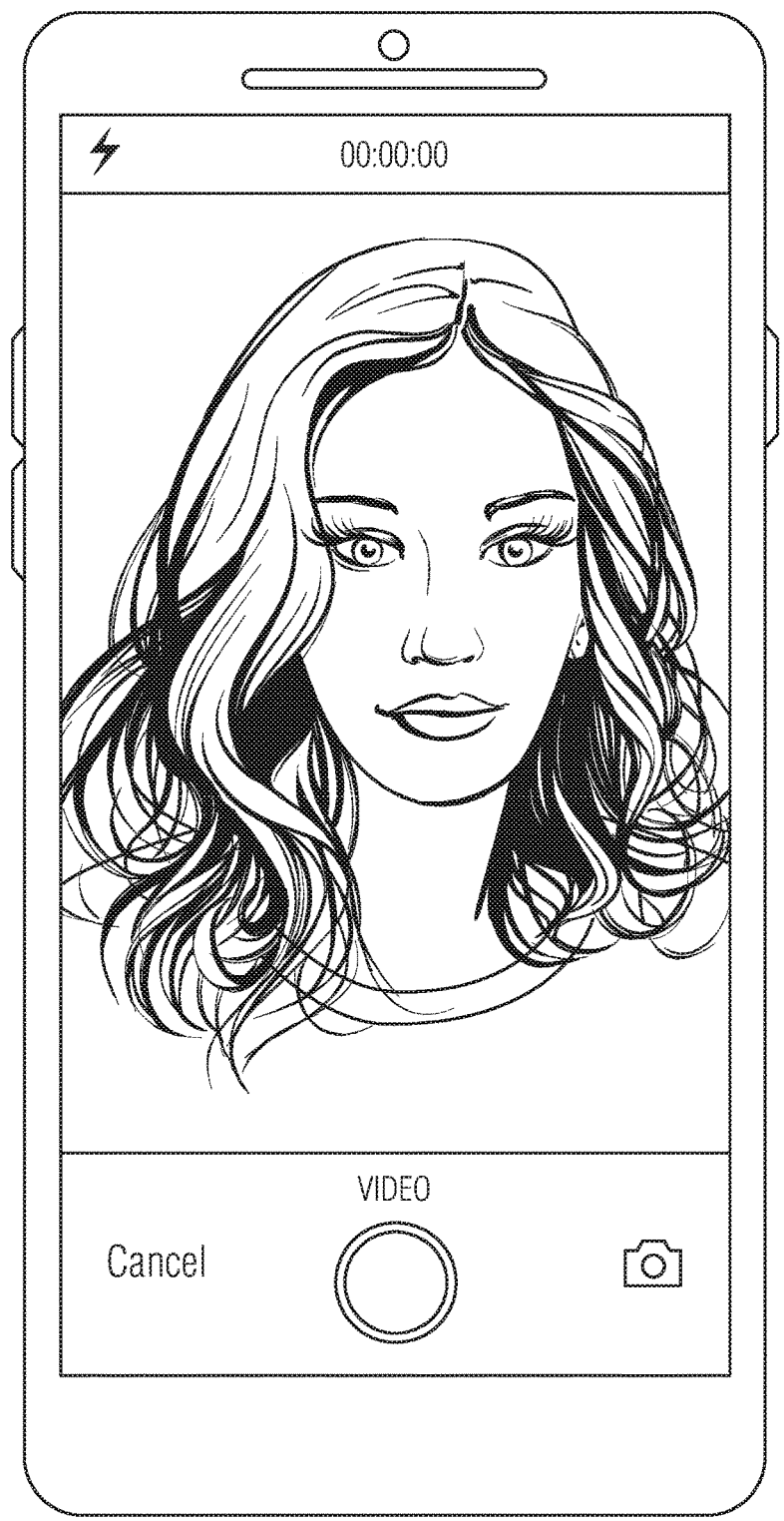
Figure 12I:
Figure 12J:
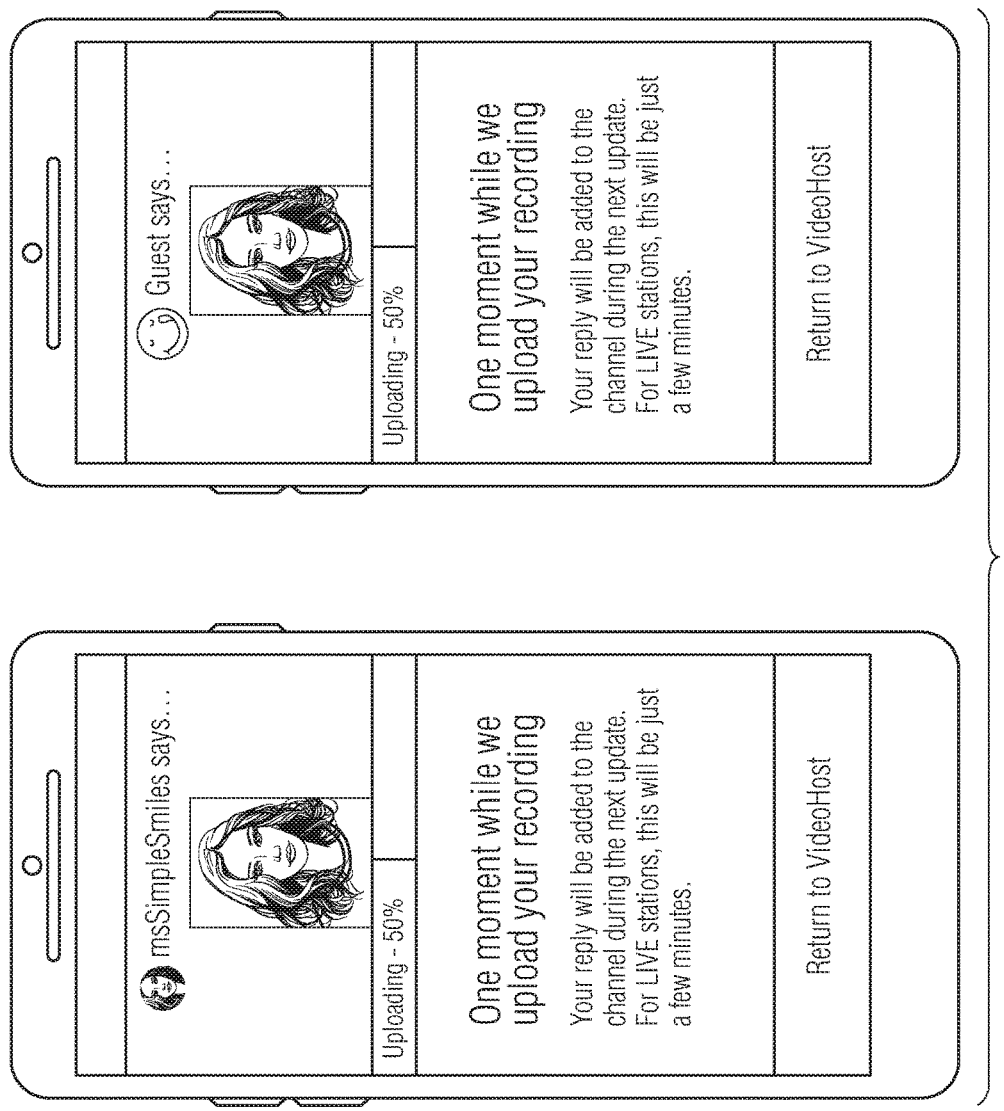
Figure 12K:
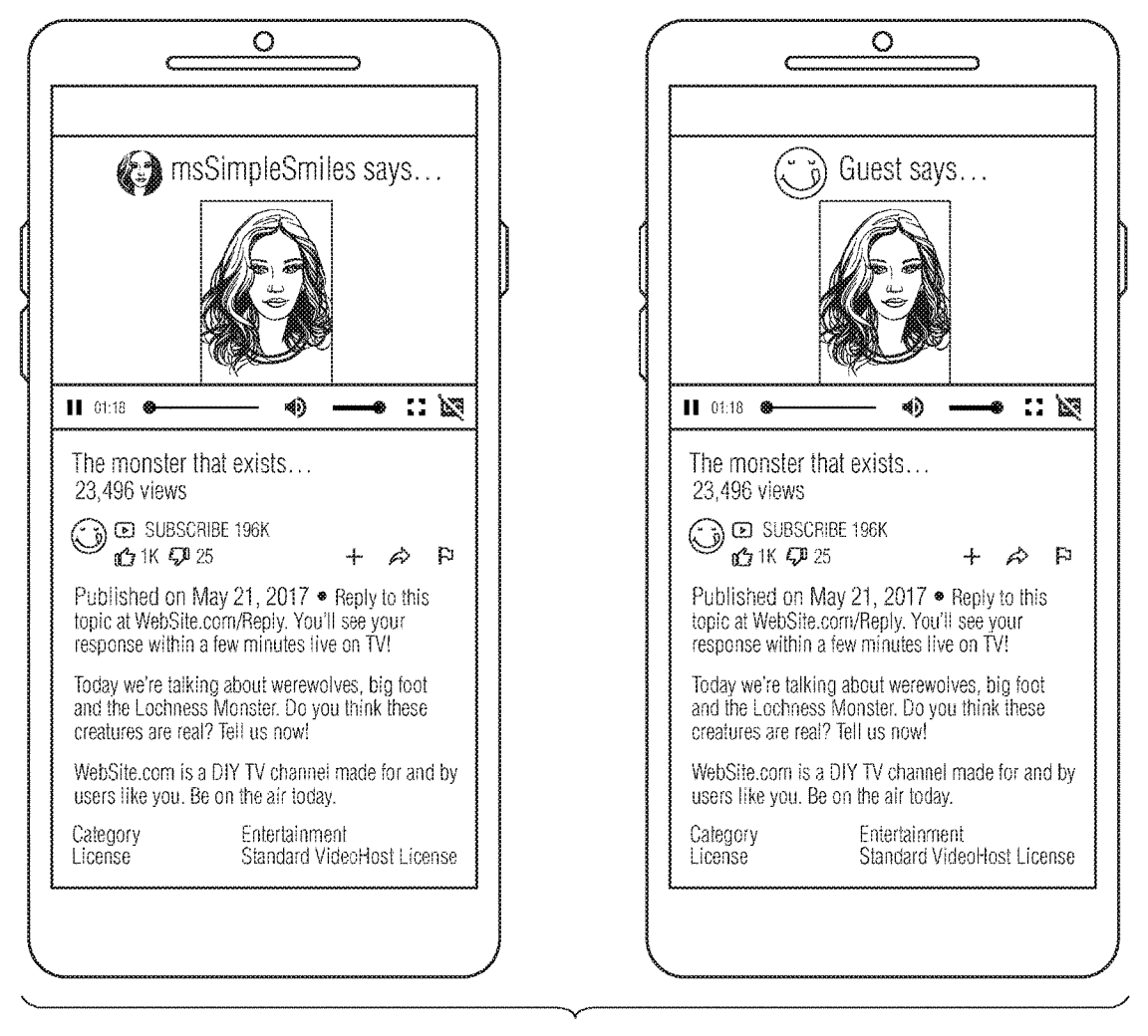

As illustrated in FIG. 12H, the user may use their cell phone camera for audio and/or video recordings. As illustrated in FIG. 12I, the user may have the option to preview their recording. As illustrated in FIG. 12J, the user may elect to upload their video and return to the distribution channel (e.g., YouTube). As illustrated in FIG. 12K, the user's video may be displayed using the distribution channel.

In some embodiments, the systems and methods described herein for providing interactive live broadcast programming may be used in a "topic and reply format" where the programming (e.g., news/opinion shows, dating shows, talent shows) post one or more questions and the viewer is encouraged to record replies. The systems and methods described herein may also be used in a "pass the conch" format where the programming (e.g., game show) may allow viewers to talk live. The systems and methods described herein may also be used in a "lottery" format where the programming (e.g., trivia or game show) may provide users with questions or cards generated randomly and displayed for all viewers simultaneously.

For example, the systems and methods described herein may be used in connection with a romance reality show where hosts of the show can post questions and viewers may respond. The systems and methods described herein may be also be used in connection with a home improvement or do-it-yourself program where one user may upload a video corresponding to an issue, project, or tour of a house and other viewers may respond with expert responses (crowdsourcing). The systems and methods described herein may be also be used in connection with collectables, storage wars programming where users may record a video of their collectables and receive bids or offers to buy using the described platform. The systems and methods described herein may be also be used in connection with cooking shows where a user may respond to a host's invitation with pictures, recipes, and opinions to the questions. Systems and methods described herein may be also be used in connection with fashion, mysteries, alien, supernatural, and trivia shows.

In some embodiments, the systems and methods described herein are configured to integrate with existing media. For example, content produced by a news organization (e.g., the Wall Street Journal or CNN) may be used and a user may be asked to comment or ask questions after segments (e.g., after each audio segment of a program) produced by the news organization. A similar procedure may exist for video applications that news organizations (e.g., CNN, Comcast) may host. In some examples, environment 100 may be involved with the news organization directly, whereas in some examples, environment 100 may be involved indirectly, such as at an operating system level (e.g., through Amazon).

In some embodiments, the systems and methods described herein may display user recordings integrated with the live programming in real-time or in a near real-time time frame. In some embodiments, the systems and methods described herein may use pre-moderation, wherein user recordings may be moderated in advance of receiving the user recordings based on the user's reputation thus providing a faster moderation process.

In some embodiments, the systems and methods described herein for providing interactive live broadcast programming may include feedback mechanisms such as solicitation, and stitching to integrate viewers into the live program experience. In some examples, environment 100 may allow a show producer to put the user "on the air" and in an manner that the user can correspond "live"—that is, the user may be listening and talking on their phone, while environment 100 may create a show stream of the interaction appropriate to the video technology (for example, removing the show side of the interaction)—so that environment 100 can be stitched together with the show and/or blended side-by-side with the sow. Thus, environment 100 may allow the user interaction stream to be placed on the air after an appropriate "on air delay" by the show producer.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for providing interactive live broadcast programming, the system comprising:
   at least one client device;
   at least one display device associated with the at least one client device;
   an ingest server configured to receive, from the at least one client device, one or more user generated responses to interaction prompts associated with a live broadcast program, the interaction prompts displayed on the at least one display device associated with the at least one client device, the ingest server configured to process the received one or more responses for content and/or compatibility with the live broadcast program, and store the processed response in a database, the ingest server comprising:
      a moderation module comprising one or more algorithms for determining whether to store the processed response in the database without human review, the moderation module generating a queue of processed responses based on quality and user information associated with each processed response;
   a show creation server configured to generate a segment to be added to an interactive live program by generating a playlist that comprises at least one response among the stored one or more responses to form the segment and integrating the segment with the interactive live program; and
   a streaming server configured to transcode the interactive live program with the segment into at least one format suitable for display on the at least one display associated with the at least one client device and transmit the transcoded interactive live program to the at least one client device for display.

2. The system of claim 1, wherein the streaming server is further configured to:
   transmit the transcoded interactive live program to one or more distribution platforms.

3. The system of claim 1, wherein the ingest server is further configured to:
   normalize the received one or more responses from one or more first formats to a standardized format.

4. The system of claim 1, wherein the show creation server is further configured to:
   generate the one or more interaction prompts to be included in the live broadcast program, wherein each of the one or more interaction prompts is associated with metadata readable by the client device.

5. The system of claim 4, wherein the metadata is readable by a listener application executing on the client device.

6. The system of claim 1, wherein the ingest server is further configured to:

analyze the one or more responses to identify whether the one or more responses comprises objectionable content.

7. The system of claim 1, wherein the show creation server is further configured to:
assemble the one or more responses in the playlist into a single component; and
record the single components as a video signal.

8. The system of claim 1, wherein the ingest server is further configured to:
modify each of the one or more responses by performing one of more of: removing leading and tailing blank spaces, reducing background noise, adjusting brightness, adjusting tonality, submitting the one or more responses for transcription, seeking keywords, and flagging items in the transcription that indicate the relevance or appropriateness of the one or more response.

9. A method of facilitating a live broadcast program, comprising:
providing, by a computing system, a live broadcast program to one or more client devices for display, the live broadcast program comprising one or more interaction prompts, the computing system comprising non-transitory memory storing computer readable instructions and a processor configured to execute the computer readable instructions;
receiving, by the computing system from at least one device among the one or more client devices, one or more user generated responses to an interaction prompt associated with live broadcast program;
processing, by the computing system, the received one or more responses for content and/or compatibility with the live broadcast program by transcribing audio in each received response and evaluating the transcribed audio and images in each response without human interaction;
storing, by the computing system, the one or more responses that are compatible with the live broadcast program in a database based on the evaluated transcribed audio and images in each response;
generating, by the computing system, a segment to be added to the live broadcast program by generating a playlist that comprises at least one response among the stored one or more responses to form the segment;
integrating, by the computing system, the segment with the live broadcast program;
transcoding, by the computing system, the live broadcast program with the segment into at least one format suitable for display on a display associated with each of the one or more client devices;
transmitting, by the computing system, the transcoded live broadcast program to the one or more client devices for display.

10. The method of claim 9, wherein transmitting, by the computing system, the transcoded live broadcast program to the one or more client devices for display, comprises:
transmitting the transcoded live broadcast program to one or more distribution systems.

11. The method of claim 9, wherein storing, by the computing system, the one or more responses that are compatible with the live broadcast program in the database, comprises:
normalizing the received one or more responses from one or more first formats to a standardized format.

12. The method of claim 9, wherein providing, by the computing system, the live broadcast program to the one or more client devices for display, comprises:
generating the one or more interaction prompts to be included in the live broadcast program, wherein each of the one or more interaction prompts is associated with metadata readable by the one or more client devices.

13. The method of claim 12, wherein the metadata is readable by a listener application executing on the client device.

14. The method of claim 9, wherein storing, by the computing system, the one or more responses that are compatible with the live broadcast program in the database, comprises:
analyzing the one or more responses to identify whether the one or more responses comprises objectionable content.

15. The method of claim 9, generating, by the computing system, the segment to be added to the live broadcast program by generating the playlist that comprises the at least one response among the stored one or more responses to form the segment comprises:
assembling the one or more responses in the playlist into a single component; and
recording the single components as a video signal.

16. The method of claim 9, generating the playlist further comprises:
modifying each of the one or more responses by performing one of more of: removing leading and tailing blank spaces, reducing background noise, adjusting brightness, adjusting tonality, submitting the one or more responses for transcription, seeking keywords, and flagging items in the transcription that indicate the relevance or appropriateness of the one or more response.

17. A non-transitory computer readable medium comprising computer readable instructions, which, when executed by one or more processors, cause the one or more processors to perform operations, comprising:
providing a live broadcast program to one or more client devices for display, wherein the live broadcast program comprises one or more interaction prompts;
receiving, from at least one device among the one or more client devices, one or more user generated responses to an interaction prompt associated with live broadcast program;
processing the received one or more responses for content and/or compatibility with the live broadcast program by transcribing audio in each received response and evaluating the transcribed audio and images in each response without human interaction;
storing the one or more responses that are compatible with the live broadcast program in a database based on the evaluated transcribed audio and images in each response;
generating a segment to be added to the live broadcast program by generating a playlist that comprises at least one response among the stored one or more responses to form the segment;
integrating the segment with the live broadcast program;
transcoding the live broadcast program with the segment into at least one format suitable for display on a display associated with each of the one or more client devices;
transmitting the transcoded live broadcast program to the one or more client devices for display.

18. The non-transitory computer readable medium of claim 17, wherein transmitting the transcoded live broadcast program to the one or more client devices for display, comprises:

transmitting the transcoded live broadcast program to one or more distribution systems.

19. The non-transitory computer readable medium of claim 17, wherein storing the one or more responses that are compatible with the live broadcast program in the database, comprises:

normalizing the received one or more responses from one or more first formats to a standardized format.

20. The non-transitory computer readable medium of claim 17, wherein providing the live broadcast program to the one or more client devices for display, comprises:

generating the one or more interaction prompts to be included in the live broadcast program, wherein each of the one or more interaction prompts is associated with metadata readable by the one or more client devices.

21. The non-transitory computer readable medium of claim 20, wherein the metadata is readable by a listener application executing on the client device.

22. The non-transitory computer readable medium of claim 17, wherein storing the one or more responses that are compatible with the live broadcast program in the database, comprises:

analyzing the one or more responses to identify whether the one or more responses comprises objectionable content.

23. The non-transitory computer readable medium of claim 17, generating the segment to be added to the live broadcast program by generating the playlist that comprises the at least one response among the stored one or more responses to form the segment comprises:

assembling the one or more responses in the playlist into a single component; and recording the single components as a video signal.

24. A system for providing interactive live broadcast programming, the system comprising:

an ingest server configured to receive, from at least one client device, one or more user generated responses to interaction prompts associated with a live broadcast program, the interaction prompts displayed on at least one display device associated with the at least one client device, the ingest server configured to process the received one or more responses for content and/or compatibility with the live broadcast program, and store the processed one or more responses in a database the ingest server comprising:

a moderation module comprising one or more algorithms for determining whether to store the processed response in the database by transcribing audio in each received response and evaluating images in each response without human interaction;

a show creation server configured to generate a segment to be added to an interactive live program by generating a playlist that comprises at least one response among the stored one or more responses to form the segment and integrate the segment with the interactive live program; and a streaming server configured to transcode the interactive live program with the segment into at least one format suitable for display on the at least one display associated with the at least one client device and transmit the transcoded interactive live program to the at least one client device for display.

25. The system of claim 24, wherein the streaming server is further configured to:

transmit the transcoded interactive live program to one or more distribution platforms.

26. The system of claim 24, wherein the ingest server is further configured to:

normalize the received one or more responses from one or more first formats to a standardized format.

27. The system of claim 24, wherein the show creation server is further configured to:

generate the one or more interaction prompts to be included in the live broadcast program, wherein each of the one or more interaction prompts is associated with metadata readable by the client device.

28. The system of claim 24, wherein the ingest server is further configured to:

analyze the one or more responses to identify whether the one or more responses comprises objectionable content.

29. The system of claim 24, wherein the show creation server is further configured to:

assemble the one or more responses in the playlist into a single component; and record the single components as a video signal.

30. The system of claim 24, wherein the ingest server is further configured to:

modify each of the one or more responses by performing one of more of: removing leading and tailing blank spaces, reducing background noise, adjusting brightness, adjusting tonality, submitting the one or more responses for transcription, seeking keywords, and flagging items in the transcription that indicate the relevance or appropriateness of the one or more response.

* * * * *